United States Patent [19]

Braun et al.

[11] 4,080,256

[45] Mar. 21, 1978

[54] NUCLEAR REACTOR APPARATUS

[75] Inventors: Howard E. Braun, Pittsburgh; Henry P. Bonnet, Mount Lebanon, both of Pa.

[73] Assignee: Westinghouse Electric Corporation, Pittsburgh, Pa.

[21] Appl. No.: 519,701

[22] Filed: Oct. 31, 1974

[51] Int. Cl.² .............................................. G21C 13/00
[52] U.S. Cl. ........................................ 176/87; 176/38
[58] Field of Search .............................. 176/37, 38, 87

[56] References Cited

U.S. PATENT DOCUMENTS

| | | | |
|---|---|---|---|
| 3,374,147 | 3/1968 | Costes | 176/37 |
| 3,446,171 | 5/1969 | Panoff et al. | 176/37 |
| 3,713,968 | 1/1973 | Kennedy et al. | 176/37 |
| 3,716,451 | 2/1973 | Sickel et al. | 176/37 |
| 3,753,853 | 8/1973 | Schabert | 176/38 |
| 3,778,346 | 12/1973 | Profos | 176/60 |
| 3,801,444 | 4/1974 | Kraemer | 176/37 |
| 3,847,735 | 11/1974 | Schluderberg | 176/38 |
| 3,859,166 | 1/1975 | Flynn et al. | 176/38 |
| 3,865,688 | 2/1975 | Kleimdla | 176/37 |
| 3,899,391 | 8/1975 | Sulzer et al. | 176/37 |
| 3,966,548 | 6/1976 | Müller et al. | 176/37 |

FOREIGN PATENT DOCUMENTS

| | | | |
|---|---|---|---|
| 1,934,748 | 1/1971 | Germany | 176/87 |

OTHER PUBLICATIONS

U.S. Reactor Containment Technology vol. II, 1965, edited by Cottrel et al.

General Electric Publication GEZ-4385.1 "Mark III Containment" received 2/8/74.

"E. D'Appolonia Consulting Engineers, Inc. 38 Report, Trusmat Containment Structure Structural Evaluation.

*Primary Examiner*—Samuel W. Engle
*Assistant Examiner*—Ralph Palo
*Attorney, Agent, or Firm*—L. A. DePaul; Z. L. Dermer

[57] ABSTRACT

The reactor and its containment, instead of being supported on a solid concrete pad, are supported on a truss formed of upper and lower reinforced horizontal plates and vertical walls integrated into a rigid structure. The plates and walls from chambers within which the auxiliary components of the reactor, such as valves, pumping equipment and various tanks, are disposed. Certain of the chambers are also access passages for personnel, pipe chases, valve chambers and the like. In particular the truss includes an annular chamber. This chamber is lined and sealed by a corrosion-resistant liner and contains coolant and serves as a refueling cooling storage tank. This tank is directly below the primary-coolant conductor loops which extend from the reactor above the upper plate. The upper plate includes a sump connected to the tank through which coolant flows into the tank in the event of the occurrence of a loss-of-coolant accident. The truss extends beyond the containment and has chambers in the extending annulus. Pumps for circulating the coolant between the refueling coolant storage tank and the reactor are provided in certain of these chambers. The pumps are connected to the reactor by relatively short coolant conductors. Access to these pumps is readily afforded through hatches in the extending annulus.

19 Claims, 20 Drawing Figures

NUCLEAR REACTOR APPARATUS

REFERENCE TO RELATED DOCUMENTS

1. Reference Safety Analysis Report — Westinghouse RESAR 41 — Published by Westinghouse Nuclear Energy Systems. Copy available in AEC Public Document Room.
2. U.S. Pat. No. 3,115,450 — Dated Dec. 24, 1963 — Schang.
3. U.S. Pat. No. 3,287,226 — Dated Nov. 22, 1966 — Webb.

BACKGROUND OF THE INVENTION

This invention relates to the generation of power and has particular relationship to power generators in which the primary source of energy is a nuclear reactor. Nuclear reactor apparatus includes a nuclear reactor in a containment typically in the form of a domed right cylinder of reinforced or precompressed concrete. Inlet and outlet conductors for the primary coolant extend radially at different angles between the reactor and vapor generators. Typically the coolant is pressurized water at about 2250 pounds per square inch pressure and temperature of about 630° F. Other fluids may serve as primary and secondary fluid or only one fluid may be used as in the boiling water reactor and, to the extent that this invention is applicable to such other fluids, reactor apparatus in which such other fluids are used is within the scope of this invention. The vapor steam generators and primary coolant conductors are within the containment and the secondary coolant from the vapor generators is supplied to turbines outside of the containment. Auxiliary components such as pumping equipment and various tanks are contained in other auxiliary buildings outside of the containment.

In accordance with the teachings of the prior art as typified by RESAR 41 the containment and reactor are supported on a flat solid base mat which, depending on seismic conditions, may have a vertical thickness of between nine feet and fifty feet. The containment and mat are herein sometimes called the containment building. The base mat has a slot whose cross section has the form of a key slot and through which the reactor and the core instrumentation tubes extend. In post-tensioned containments just below the mat there is a peripheral chamber which affords access to the stressing tendon anchorages that extend around the containment. A refueling coolant (typically water) storage tank, which is normally used to fill the spent-fuel transfer canal and in the event of a loss of coolant accident is used for emergency coil cooling, is located outside of the containment in prior art apparatus. This tank contains a quantity of coolant which is very large compared to the quantity in the reactor and during a loss-of-coolant accident, this refueling coolant storage tank supplies replacement coolant to the reactor. The supply of this replacement coolant is controlled by valves and electrical switching equipment and is effected by pumping units, each unit typically including a high-head pump, a low-head pump and a spray pump. Each pumping unit and its valves and switching equipment is called a safety injection system train. These pumps as well as the refueling coolant storage tank are connected to the reactor by conductors or piping. The high-head pump operates to supply coolant to the reactor for a small brake in the primary coolant system, the low-head pump for a large break in this system and the spray pump supplies coolant to react with radioactive chemicals (iodine) to wash them into a sump. The coolant from the brake during a loss-of-coolant accident flows into this sump. In the prior-art reactor apparatus the pumping units operate to pump coolant from the refueling coolant storage tank until the tank is empty. Then the pumping units are switched to pump the coolant from the sump into the reactor. This switching is accomplished manually and if the personnel, under the stress of an accident, fails to switch the pumping units timely from the tank to the sump, or the transfer fails for equipment reasons, the reactor loses its coolant supply and may melt. Failure to operate on a test of analogous safeguard pumping units of a boiling water reactor is reported in an article by William Stockton entitled *Nuclear Power Plants: How Safe Are They* which appeared in the Pittsburgh Post Gazette of Oct. 17, 1974.

The pumping units, valves, and electrical switching equipment constituting the safety injection system are in an auxiliary building outside of the containment. Typically, in the interest of safety, there may be two, three, or four safety injection system trains which in operation inject coolant at angularly spaced positions of the primary coolant system of the reactor. The piping and electrical conductors forming these connections for each train must be isolated from each other. Each train is therefore located on a different floor of the auxiliary building and to enter the containment the piping and conductors of each train are led around the containment periphery to a containment-penetration region. Once inside the containment the piping and electrical conductors fan out or run around an inner perimeter to reach the connecting regions to the reactor. In addition the sump is connected to the trains of pumps, valves and switching equipment through conductors between the inside of the containment and the different floors of the auxiliary building.

Both the auxiliary building containing the above-described safety injection system trains and the containment and its pad are constructed to withstand seismic shocks. However, during a seismic event the building and the containment and pad, being in different locations, may respond differently to shock and the resulting rupture of the interconnections between the containment and the safety injection system trains may materially exacerbate the catastrophe of a seismic disturbance.

The cost of the safety injection system and ancillary structures and components of the prior-art nuclear apparatus is high. A reasonable estimate for these parts of typical prior-art apparatus having two or three safety injection system trains based on 1973 prices is about $20 million; $5 million for the auxiliary building and $15 million for the piping and valves.

It is an object of this invention to overcome the abovedescribed difficulties and disavantages of the prior art and to provide nuclear energy generating apparatus of substantially lower cost than prior-art apparatus in which the structure of the safety injection system shall be simplified and shall operate automatically, and independently of the personnel at a plant, to maintain the flow of coolant through a reactor during a loss-of-coolant accident, and whose damage during a seismic disturbance shall be minimized.

Another object of this invention is to provide a containment and support structure for nuclear energy generating apparatus which shall:

1. Afford structural support superior to that of prior-art apparatus and specific site independence of the containment support structure.

2. Achieve greater economy than prior-art apparatus.

3. Improve the flexibility and afford ready increase of safeguard systems.

SUMMARY OF THE INVENTION

This invention arises from the realization that the most likely area for cost improvement resides in the complex of piping valves and electrical conductors between the auxiliary building and the containment which is estimated to be $15 million in a typical installation. It has also been realized that by bringing the safety injection system into the containment building not only is the cost of this complex reduced but the safety injection system is simplified and the abovedescribed difficulties and disadvantages of the prior art are eliminated.

In accordance with this invention nuclear energy generating apparatus is provided in which the containment and reactor are supported on a truss having chambers for the components of the safety injection system, for other safety and radioactive systems, and for other components which, in accordance with the teachings of the prior-art, are included in an auxiliary building. The truss includes upper and lower slabs or plates which are integrated into a strong structure with annular and radial walls or webs. The slabs are typically of reinforced concrete and, together with the vertical walls or webs with which they are integral, form a truss which provides a more rigid base for the containment and nuclear reactor and related components than a conventional solid base mat composed of about the same quantity of concrete. The periphery of the truss extends beyond (if circular is of greater diameter than) the containment and this extended truss portion and its depth and interior construction provide the supported members with extra support surface and therefore lower soil pressure and improved stability against overturning. The containment wall support extends through the entire thickness of the truss at substantially the containment diameter. The containment reinforcement is typically, but not necessarily, a post tensioned steel tendon system. The tendon system penetrates to within the truss wherein a multiuse gallery provides anchorage. This eliminates the need for the single purpose annular cavity anchorage gallery below the base mat at the containment wall diameter used in prior-art apparatus.

The truss is to a large extent hollow and affords usable interior volume with advantageous properties. In part of this space is installed the refueling coolant storage tank for the safety injection system. The containment hermetic seal liner enclosed this tank and the core instrumentation lead cavity. The rest of the truss volume is outside the lining (except certain tanks connected to it by pipes). All the interior truss volume has the quality of being "hardened" isolated, protected and radiation shielded by the enclosing concrete and earth.

Auxiliary systems machinery and tanks are installed in some of the remaining truss volume; outside of the containment boundary. Among these are parallel identical fluid and electrical systems of 2, 3, 4 or more trains of the safety injection system. Isolation between such trains is naturally secured by installation of each train in a separate sealed arc segment of the truss. Penetration of the containment boundary from the separate safety trains can proceed within each arc segment vertically through the upper slab of the containment truss. All of the safety injection system is located within a single rigid base integral with the containment; hence, is more resistant to earthquake and other separation causes. The connection lines are also much shorter reducing their exposure.

The refueling coolant storage tank is connected to the containment above it with drain sumps in the floor of the upper slab. In the event of loss-of-coolant accident, primary coolant drains directly into this tank assuring initial and continuous supply. Suction or supply for the initial "high-head", later "low-head" safety injection pumps as well as the containment spray are taken directly from the refueling coolant storage tank. This can be through a single pipe and valve per safety train. This interconnection of storage coolant tank and containment sump eliminates the need to switch coolant supplies from initial coolant storage tank source to the containment sump following or during loss-of-coolant accident, since they are one and the same.

The hollow truss also contains auxiliary equipment and components and tanks of radioactive fluids and slurries and these components together with the safety injection system are afforded missile protection and radiation shielding. The safety trains are within the same structural building as the nuclear fluid (steam) supply system and therefore relative movement due to seismic disturbance is reduced or eliminated. The safety trains are located in separate radial compartments (not horizontal layers) virtually eliminating flooding of a train from a line break in another train. Separation into 2, 3, or 4 or more trains within separate arc compartments makes sabotage of the systems more difficult.

The interconnection of the containment sump and refueling coolant tank within the containment, automatically provides an internal heat sink. Pressure suppression or relief can be provided by connecting one or more conductors or pipes from the regions where pressure may develop. In this way a partial of whole primary system blowdown may be provided.

In summary significant benefits are realizable through the use of the truss containment building. These include greater acceptability in seismicly active areas, more reliable close-coupled safety systems, reduced risk from missiles and sabotage, earth shielding for radioactive systems, and a net reduction in nuclear island capital costs. In more detail these benefits are:

1. The broader more rigid containment base truss is applicable to more sites and particularly in seismicly active areas such as the west coast or Japan.

2. The safety train reliability is improved:
  (a) All of the safety train equipment is located on a single rigid truss which is integral with the containment. Hence the systems are more resistant to the Design Basis Earthquake.
  (b) The interconnection of refueling water and containment sump eliminates the need to switch water supplies during a loss of coolant accident.
  (c) Safety train piping is simpler and runs are shorter decreasing vulnerability and improving economy.
  (d) Excellent missile protection is afforded by location of the safety trains in the hollow truss below grade.
  (e) The safety trains are located in separate compartments which virtually eliminate flooding of a train from a line break in another train. The separation and compartmentation of each train makes sabotage of the system much more difficult.

(f) The interconnection of containment sump and refueling coolant tank automatically provides a limited (small break) pressure suppression capability. Full scale pressure suppression can be provided with some rearrangement of containment internal structure to form a hot well if it is deemed desirable.

3. The security of a number of radioactive auxiliary systems is improved by location within the inherently hardened containment truss. Therein they have shorter connecting runs to the containment boundary, are earth shielded, and are protected from external missiles.

4. The truss building significantly reduces plant capital cost.

(a) Auxiliary system piping is simplified and shortened saving $5 to $8 million in capital cost in a typical installation.

(c) Building civil construction costs are essentially unchanged even though there may be some different building volume. In a typical installation the Mechanical Auxiliary Building volume of the prior art is reduced about 450,000 ft$^3$ (~ 35%) while the hollow containment truss adds about 590,000 ft$^3$ of usable space. Because of the efficient use of concrete in the truss, the total reinforced concrete volume required in this invention is actually less than for the equivalent prior-art plants. Additional cost reduction factors are the elimination of the large (300,000 gal. in a typical case) external refueling coolant tanks which may require shielding and/or hardening in future plants and the multiple usage of the tendon (post-tensioning) gallery in the apparatus according to the invention.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which.

DETAILED DESCRIPTION OF EMBODIMENT

Figure 1:
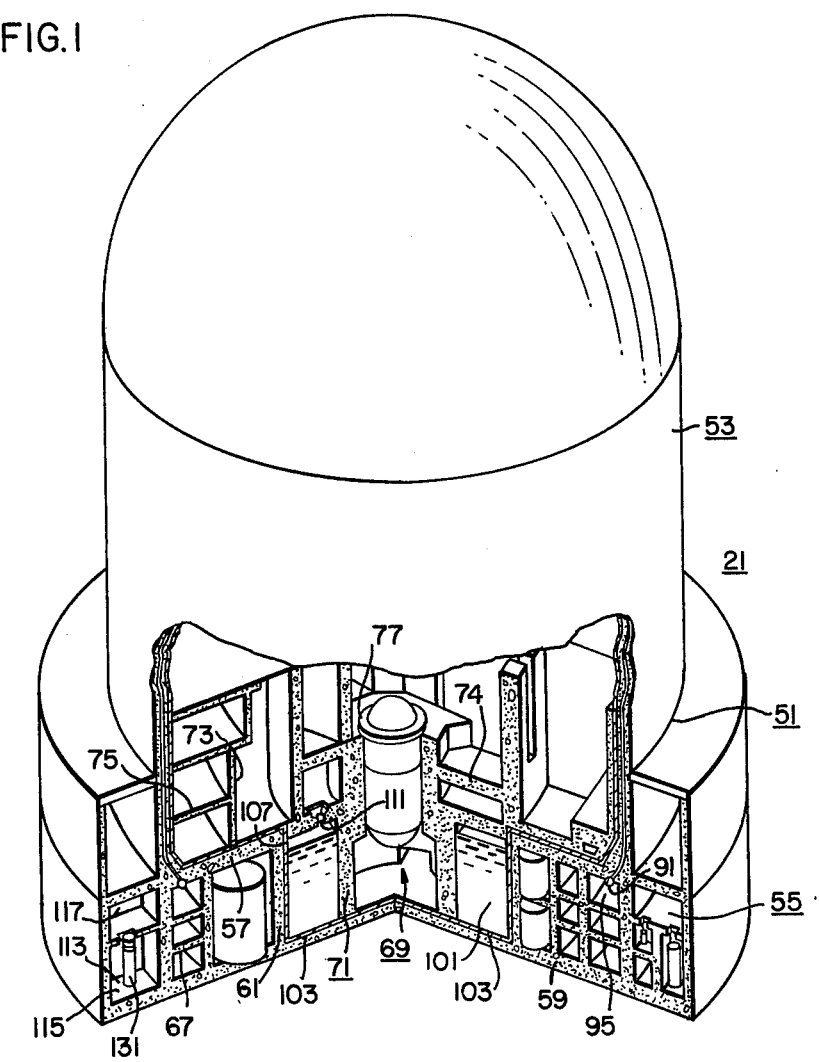
FIG. 1 is a view in perspective generally diagrammatic with a portion of the walls broken away of a preferred embodiment of this invention.

The apparatus shown in the drawings is nuclear generating apparatus 21. In the interest of concreteness, but with no intention of in any way limiting this invention, apparatus 21 whose primary source is a pressurized water reactor (PWR) 23 (FIG. 2) will be described herein. In such a reactor the coolant is water. A typical PWR reactor has a rating of 3400 thermal megawatts at the reactor output.

Figure 9A:
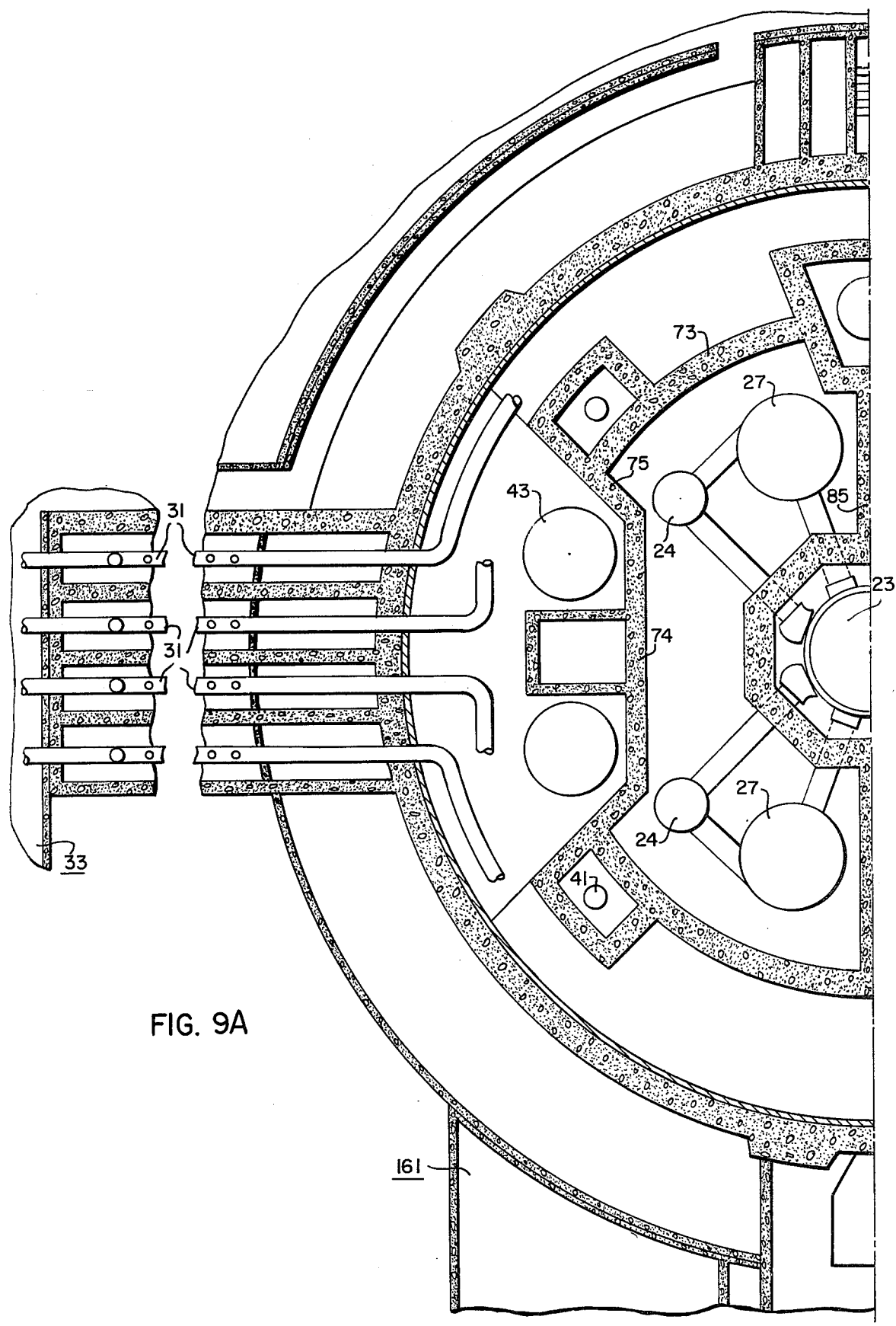
FIGS. 9A and 9B together constitute a view in transverse section taken along line IX—IX of FIGS. 4A and 4B.
Figure 9B:
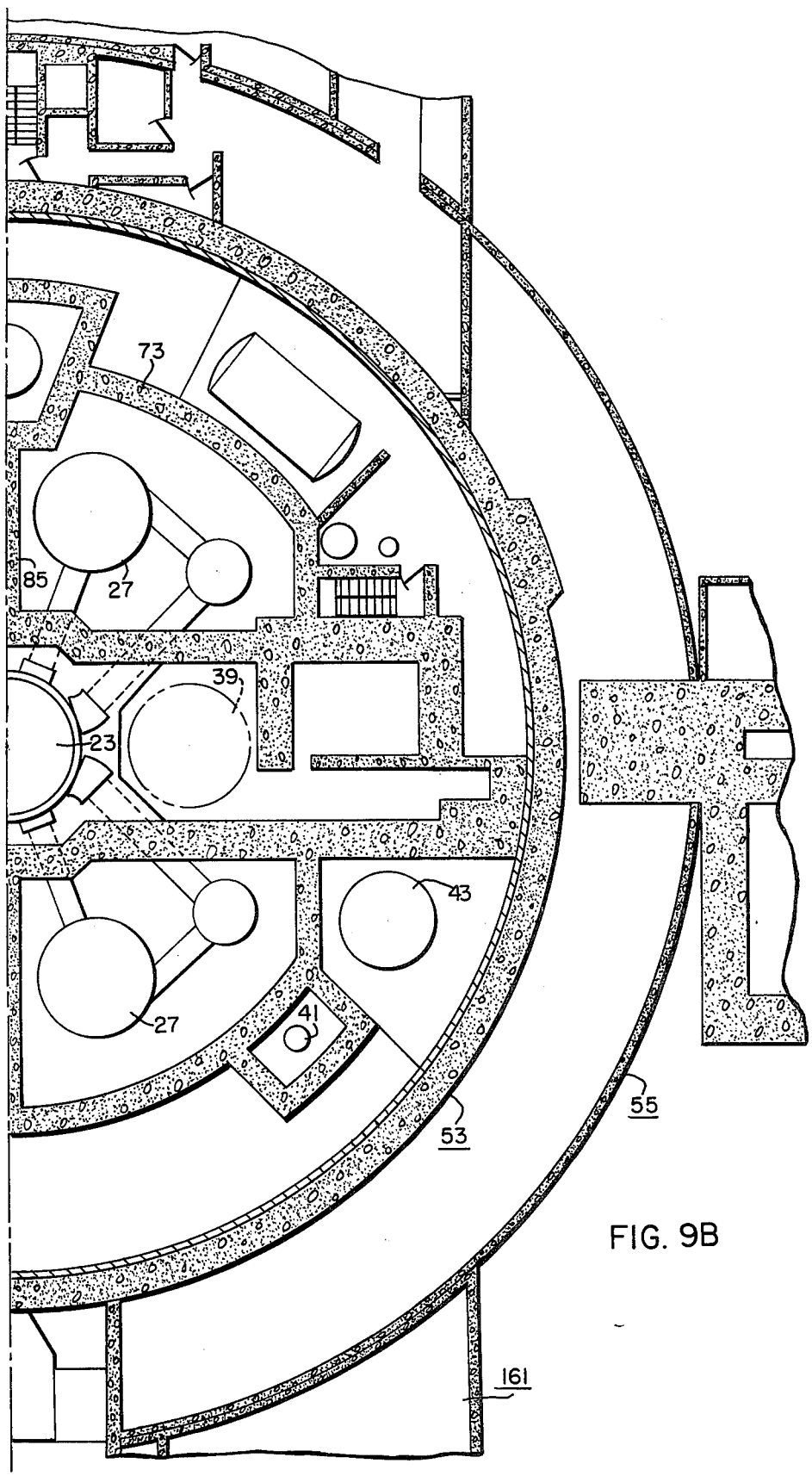
Figure 10A:
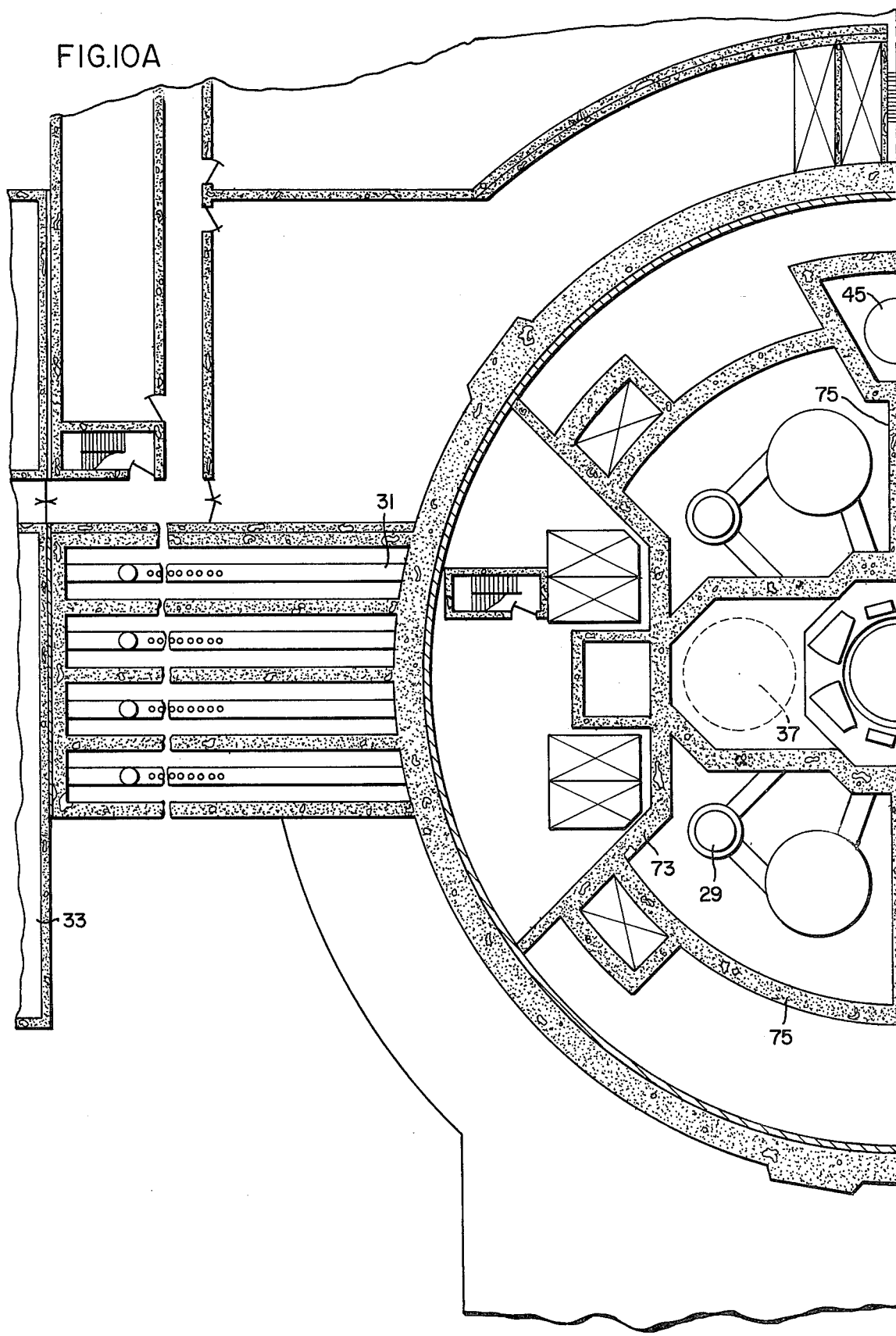
FIGS. 10A and 10B together constitute a view in transverse section taken along line X—X of FIGS. 4A and 4B.
Figure 10B:
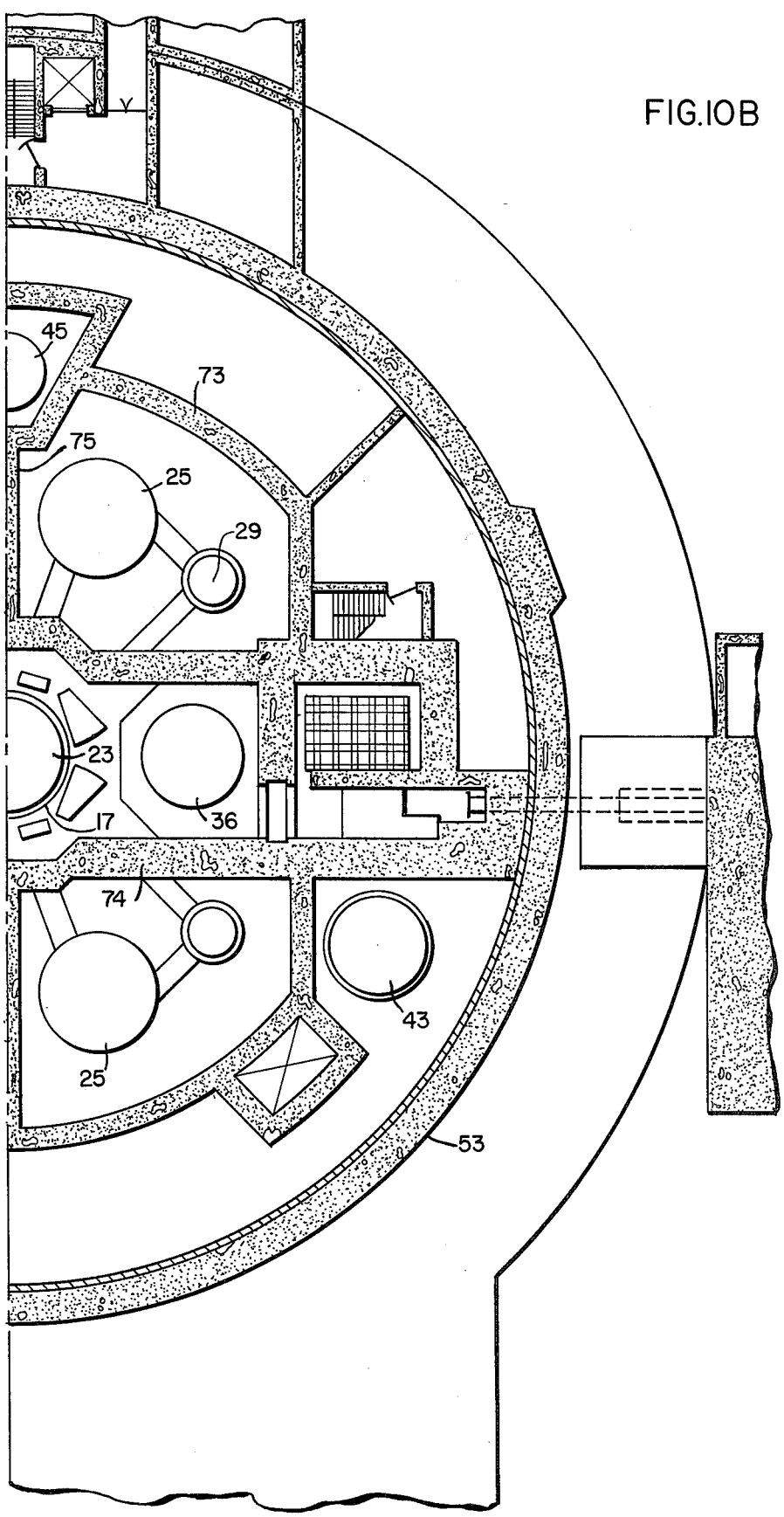
Figure 11A:
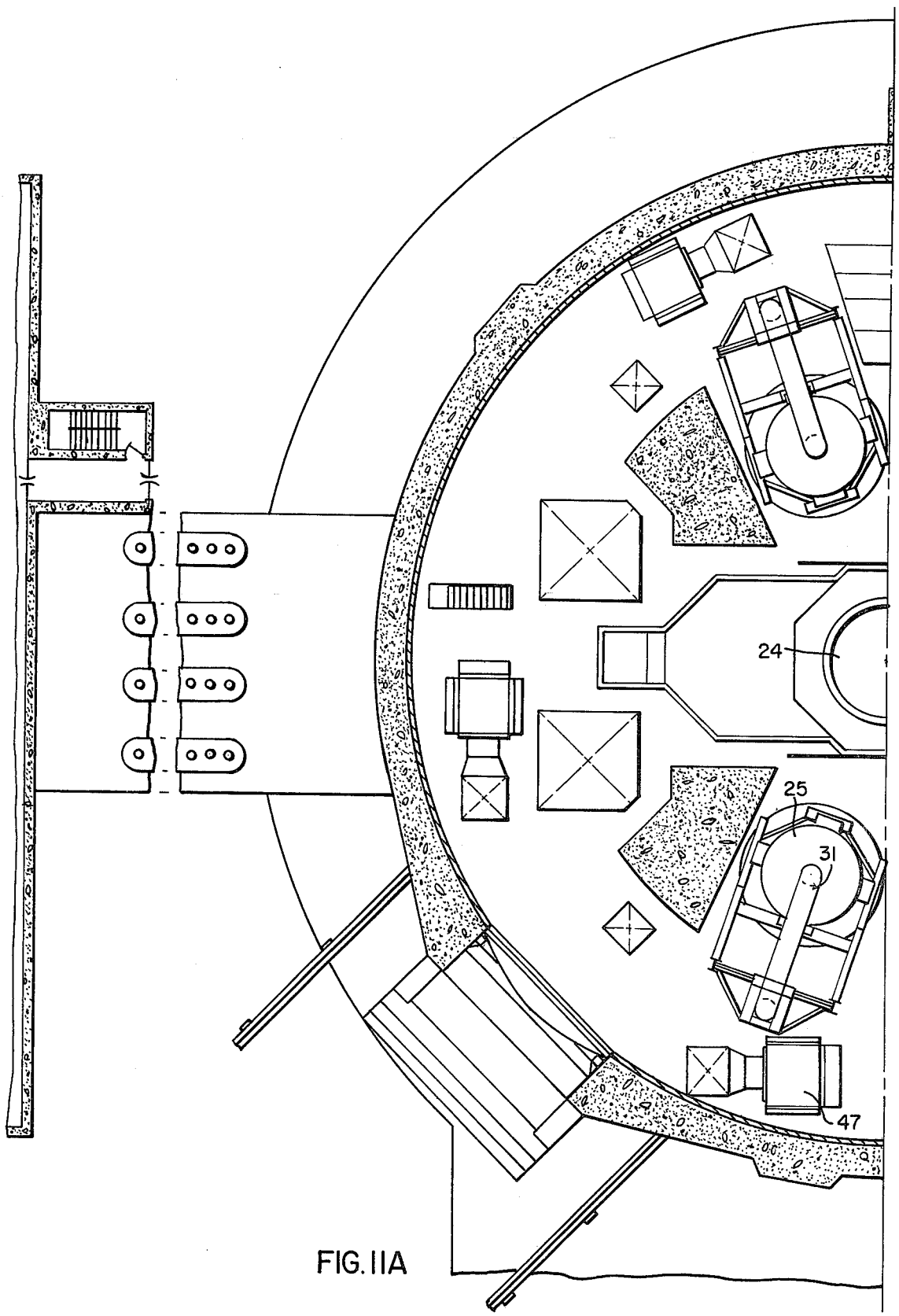
FIGS. 11A and 11B together constitute a view in transverse section taken along line XI—XI of FIGS. 4A and 4B.
Figure 11B:
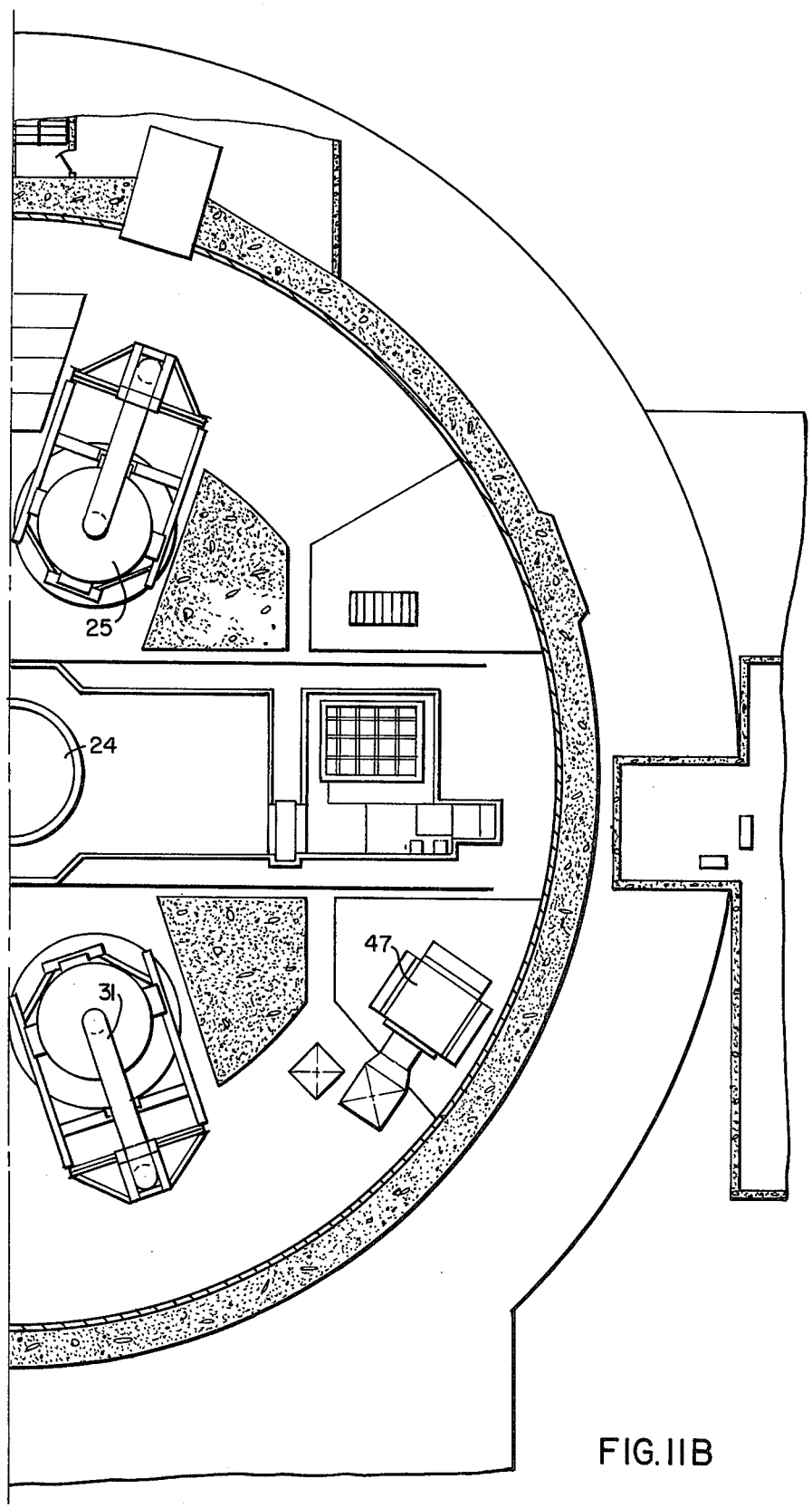

The apparatus shown in the drawings includes in addition to the reactor 23 a plurality of steam generators 25 (FIGS. 3A, 3B, 4A, 4B, 11A, 11B) and primary coolant (pressurized water) conductor loops 27 (FIGS. 3A, 3B, 9A, 9B) between the reactor 23 and each of the generators 25. Typically there may be four such loops 27 (FIGS. 9A, 9B). The primary coolant is driven through the coolant loops 27 by coolant pumps 29 (FIGS. 3A, 3B, 4A, 10A, 10B). Steam conductors 31 (FIGS. 3A, 4A, 9A, 10A) circulate the secondary fluid, steam, through the turbines (not shown) which supply electrical power and are located in a turbine building 33.

There are also a manipulator crane 35 (FIGS. 3A, 3B) for manipulating the internal parts of a reactor (not shown) during refueling or repair of the reactor. The broken line of circles 39 (FIG. 9B) and 37 (FIG. 10A) show the positions to which the upper parts and the lower parts of the reactor are moved during such operations. The apparatus also includes recirculation heat exchangers 41 (FIGS. 2, 8B, 9A and 9B), each connected into a train of the safety injection system for cooling the coolant (water) which is fed back to the reactor during a loss-of-coolant accident. Notwithstanding that during such an accident the control rods are injected into the reactor core to minimize energy generation, substantial energy (about 1%, more or less) is still being generated. There are also accumulators 43 (FIGS. 8A, 8B, 9A, 9B, 10B), a pressurizer 45 (FIG. 3B), ventilators 47 (FIG. 11B) and other auxiliary equipment.

The reactor 23 and the crane 35, the steam generators 25 and the primary coolant pipes 27, and the pumps 29, the recirculation heat exchangers 41, the accumulators 43, the pressurizer 45 and the ventilators 47 are in a containment building 51 (FIGS. 1, 2, 3B, 4A). This building 51 includes an upper domed large containment 53 (FIGS. 1, 2, 3B, 4A, 8B, 9B, 10B) of generally right cylindrical form and a supporting hollow truss 55 (FIGS. 1, 2, 4A, 5B, 6B, 7B, 9B) of generally circular form. The truss 55 is in an excavation and serves as a foundation of the building 51. The containment 53 is typically about 140 feet in diameter and about 200 feet in height; the truss 55 is typically about 180 feet in diameter and about 36 feet in depth.

Figure 6A:
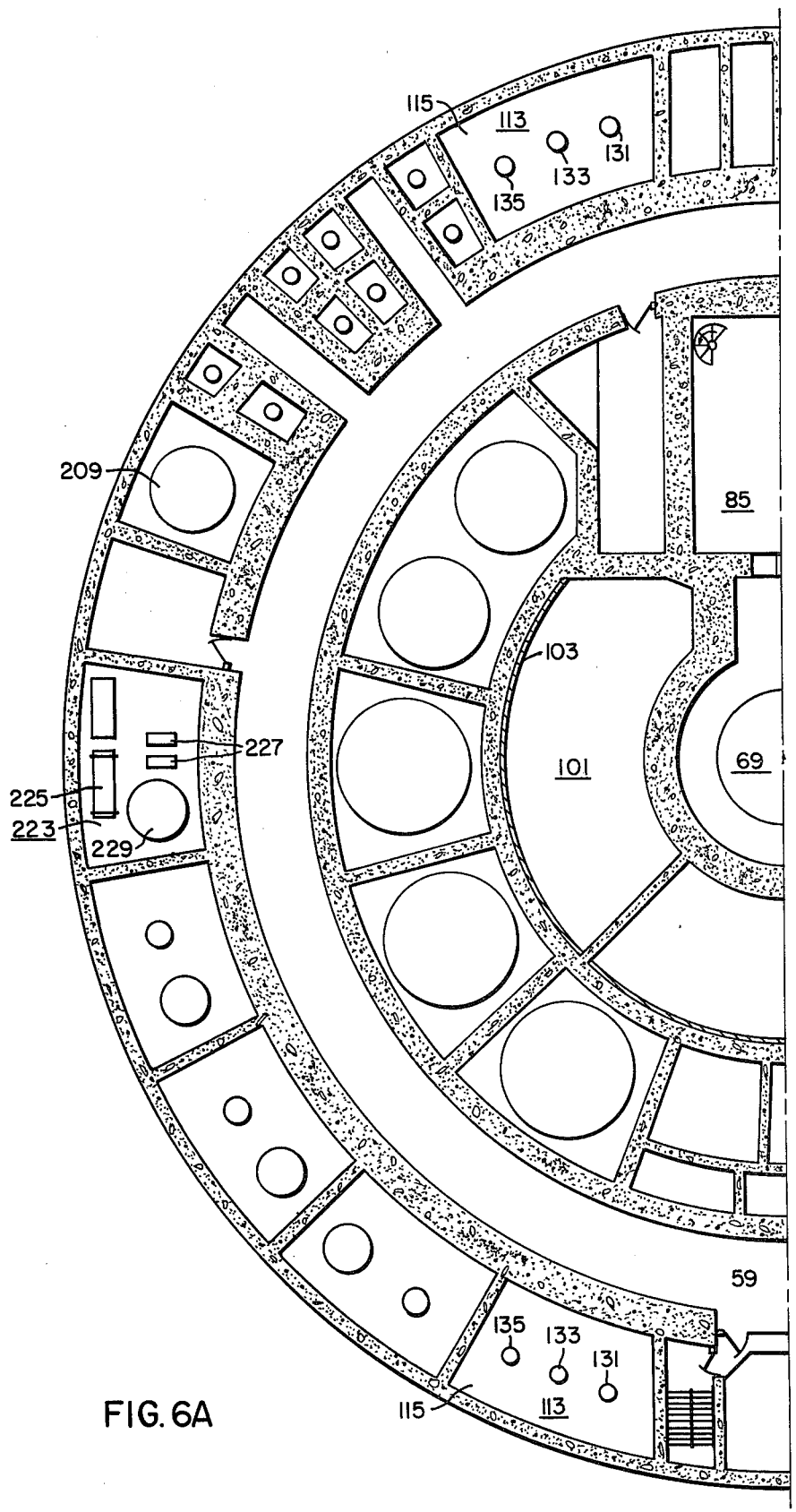
FIGS. 6A and 6B together constitute a view in transverse section taken along line VI—VI of FIGS. 4A and 4B.
Figure 6B:
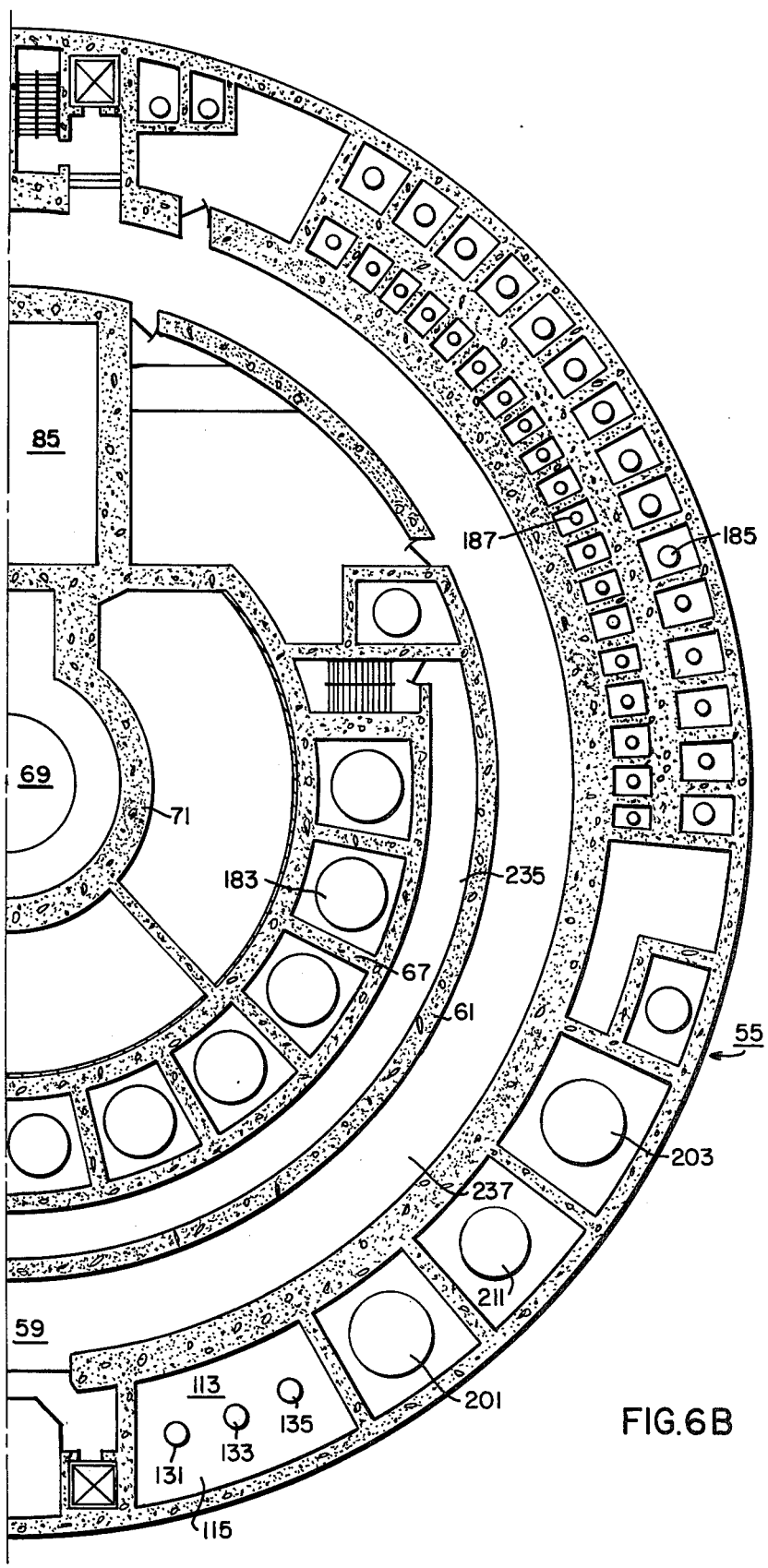
Figure 7A:
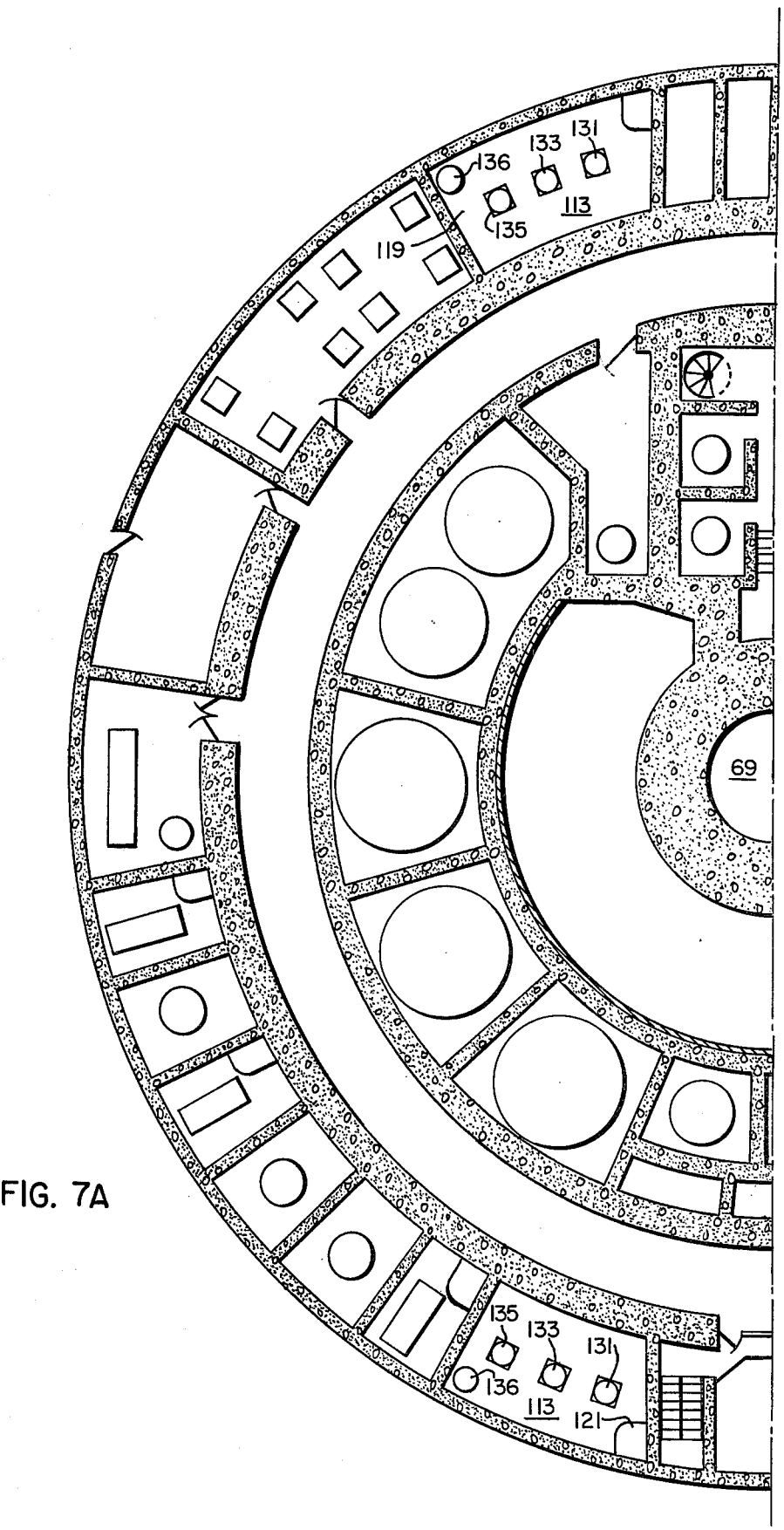
FIGS. 7A and 7B together constitute a view in transverse section taken along line VII—VII of FIGS. 4A and 4B.

The truss 55 includes an upper plate or slab 57 (FIG. 2) integral with the wall of the containment 53 and a lower plate or slab 59. The plates 57 and 59 are joined into a stiff rigid structure by annular walls 61 and radial walls 67 (FIGS. 1, 5B, 6B) which define chambers or enclosures within the truss. Typically the wall of the containment 53 has a thickness of about 2 feet, the upper plate about 5 feet, the lower plate 4 feet, the vertical walls, except at the center, about 1½ feet and the radial walls about 1 foot. A well 69 (FIGS. 1, 2, 3B, 4B, 6A, 7A, 7B) extends from the containment to the plate 59. This well 69 is defined by a wall 71 which near the plate 59 has a keyhole cross-section with the bulbous portion annular and typically about 5 feet thick (FIGS. 5A, 5B) tapering to 3 feet (FIGS. 6A, 6B) above. The linear portion of the key slot is about 3 feet thick. Above this portion the wall 71 merges into a closed annular cross-section (FIGS. 7A, 7B) which still higher merges into a closed hexagonal cross-section (FIGS. 8A, 8B). Above (FIGS. 9A, 9B, 10A, 10B) this wall 71 serves as a center for a network of integral annular and transverse and radical walls 73, 74 and 75 (FIGS. 1, 3A, 4A) which define chambers shielding the steam generators 27, the pumps 29, the pipes 31, the heat exchangers 41, the accumulators 43, and other related parts from the reactor 23. The walls 73 and 75 and the upper wall 71 are typically about 2 feet in thickness.

Within the containment the wall 71 (FIGS. 1, 4A, 4B) has a shoulder or ledge on which the reactor 23 is supported. The flange 77 of the reactor 23 is seated on this shoulder and the periphery of the flange is sealed. There is water 79 (FIGS. 3A, 3B) in the chamber above the top of the reactor 23. The crane 35 is seated on a shoulder 81 near the top of the wall 71. An in-core instrumentation tube 83 (FIGS. 3A, 3B) carrying the instrumentation cables extends from the bottom of the reactor to the bottom of the truss 55 whence it passes through a seal in wall 71 into the in-core instrumentation chamber 85.

The plates 57 and 59 are formed of reinforced concrete. The wall of the containment 53 is precompressed by tendon anchors 91 (FIG. 3A) which penetrate the containment wall around its periphery. Tensioning apparatus 93 for the tendon anchors 91 is provided in an annular chamber 95 under the peripheral rim of the plate 57. This chamber 95 also serves for passage of attending personnel and also as a clean-air duct.

A chamber 101 (FIGS. 1, 2, 3A, 4A, 4B, 5A, 5B, 6A, 6B) in the form of a keyhole whose bulbous portion is generally annular and which extends around the well 69 under the coolant conductors 27 serves as refueling coolant storage tank. This chamber 101 extends between the upper plate 57 and the lower plate 59 and has a corrosion resistant (stainless steel) lining 103. The lining 103 is coextensive with a ferrous steel lining 105 (FIG. 2) with which the wall of the containment 53 is lined. The linings 103 and 105 are joined by a weld 107. The liner 105 extends under the plate 57 typically at a depth of about 1 foot. The chamber 101 has a vent 102 (FIG. 4B) for discharging excessive steam. Typically, the chamber 101 has an inner diameter of 34 feet, an outer diameter of 80 feet and is 27 feet in height. With refueling coolant at a depth of 23 feet there are about 560,000 gallons of coolant in chamber 101. The quantity of coolant in the reactor is small compared to this quantity.

Above the chamber 101 there are a plurality of sumps 109 (FIGS. 2, 4A, 5A, 5B). Gravity drain lines 111 from the sumps 109 discharge coolant into the chamber 101 on the occurrence of a loss-of-coolant accident. The sumps 109 are constructed so as to suppress the flow into tank 101 of sediment picked up by the leaking reactor coolant. The outlet drain lines 111 are submerged beneath the coolant level to minimize the recirculation of radioactive vapor (water vapor) into the containment 53.

A plurality of independent safety injection system trains 113 (FIGS. 2, 3B, 5A, 5B, 6A, 6B, 7A, 7B) supply coolant from the refueling coolant storage tank 101 to the reactor. Each system 113 is disposed in a plurality of separate chambers or compartments 115, 117, 119 extending from the lowest level of the annulus of the truss 55 outwardly from the containment 53. These trains are readily accessible from a hatch 121 in the annulus of plate 57 which extends outside of the containment 53. The chambers 115, 117, 119 are compartmented to prevent flooding of a train in the event of a coolant-line rupture in another train and to reduce the probability of damage caused by external or internal missiles or intentional sabotage.

Figure 2:
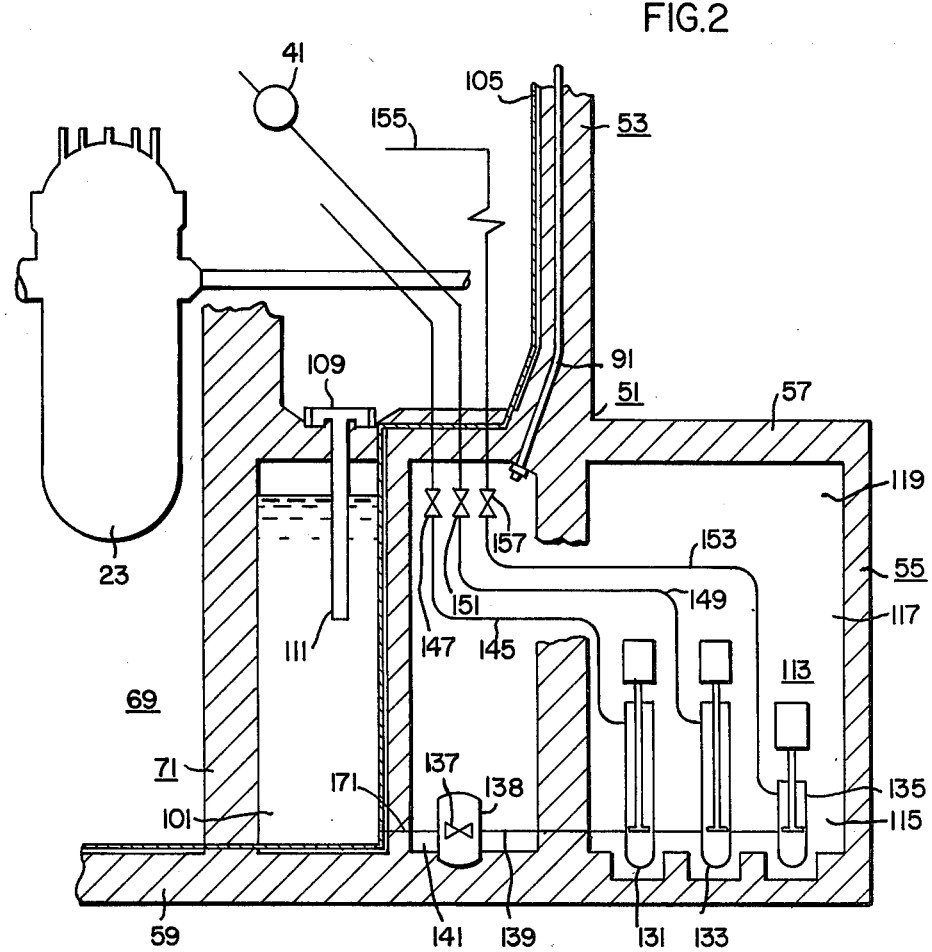
FIG. 2 is a fragmental view in longitudinal section generally diagrammatic showing the safety injection system of apparatus in accordance with this invention.
Figure 3A:
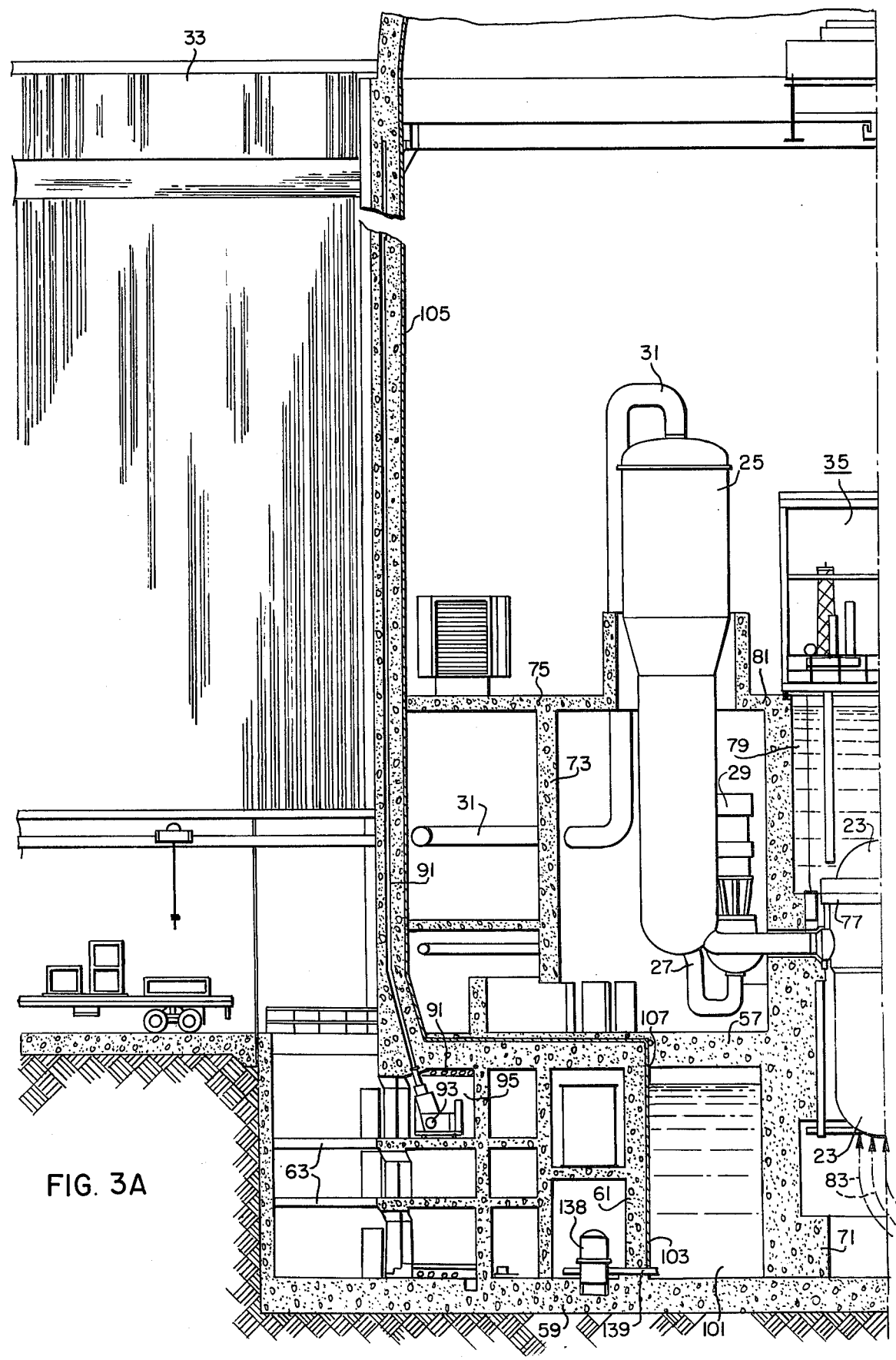
FIGS. 3A and 3B together constitute a view in longitudinal section taken along line III—III of FIGS. 5A and 5B.
Figure 3B:
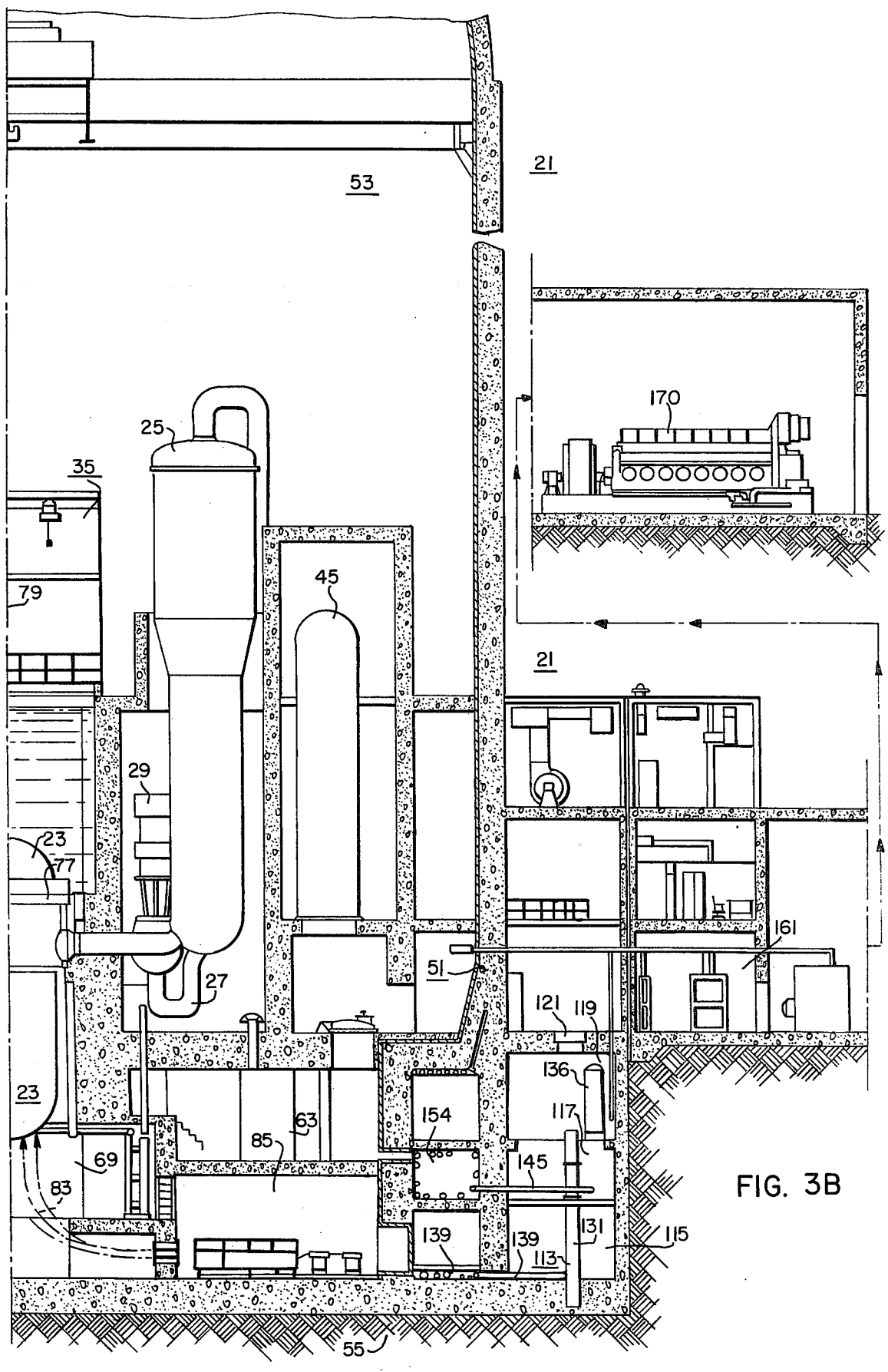
Figure 5A:
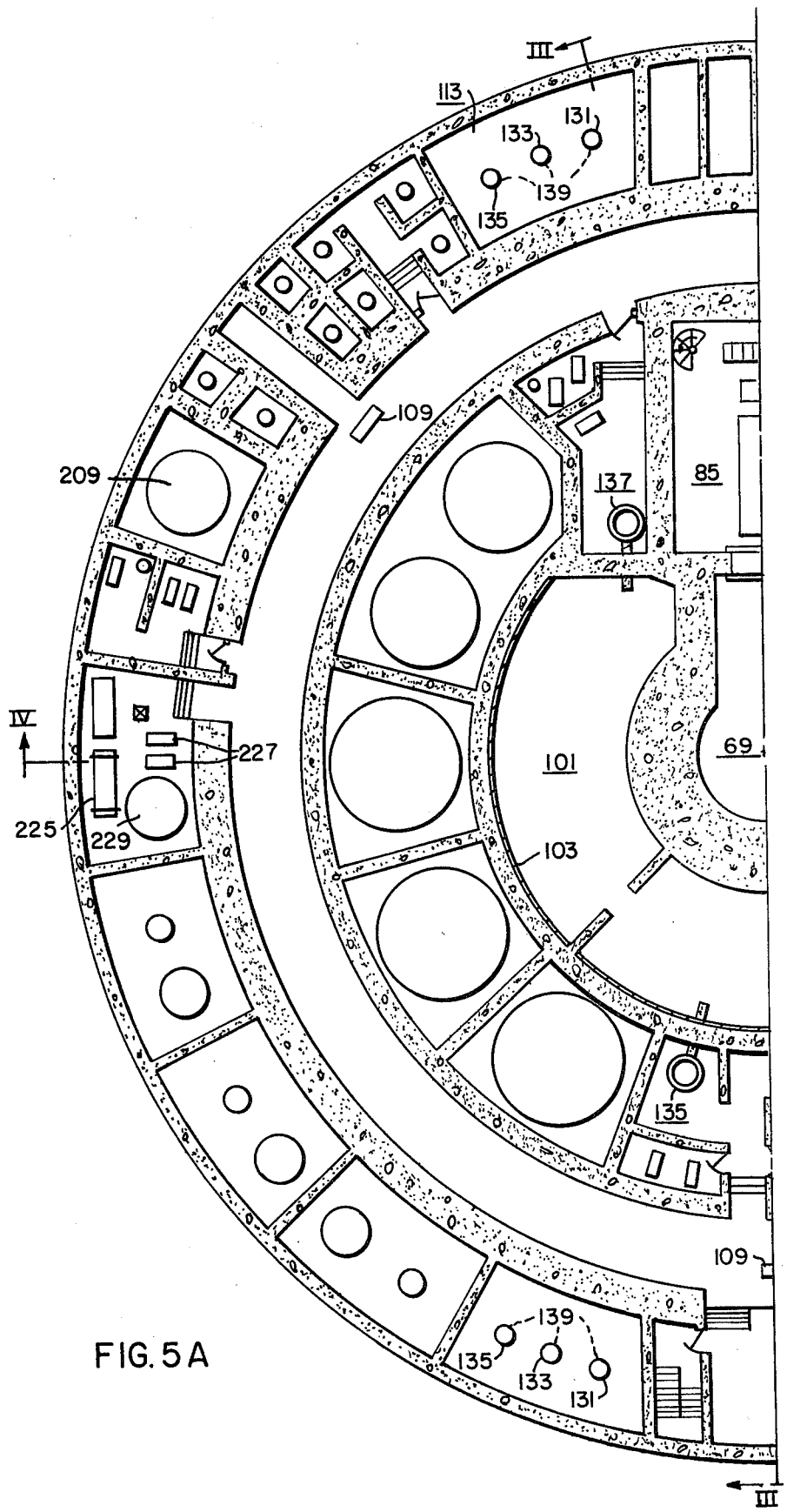
FIGS. 5A and 5B together constitute a view in transverse section taken along line V—V of FIGS. 4A and 4B.
Figure 5B:
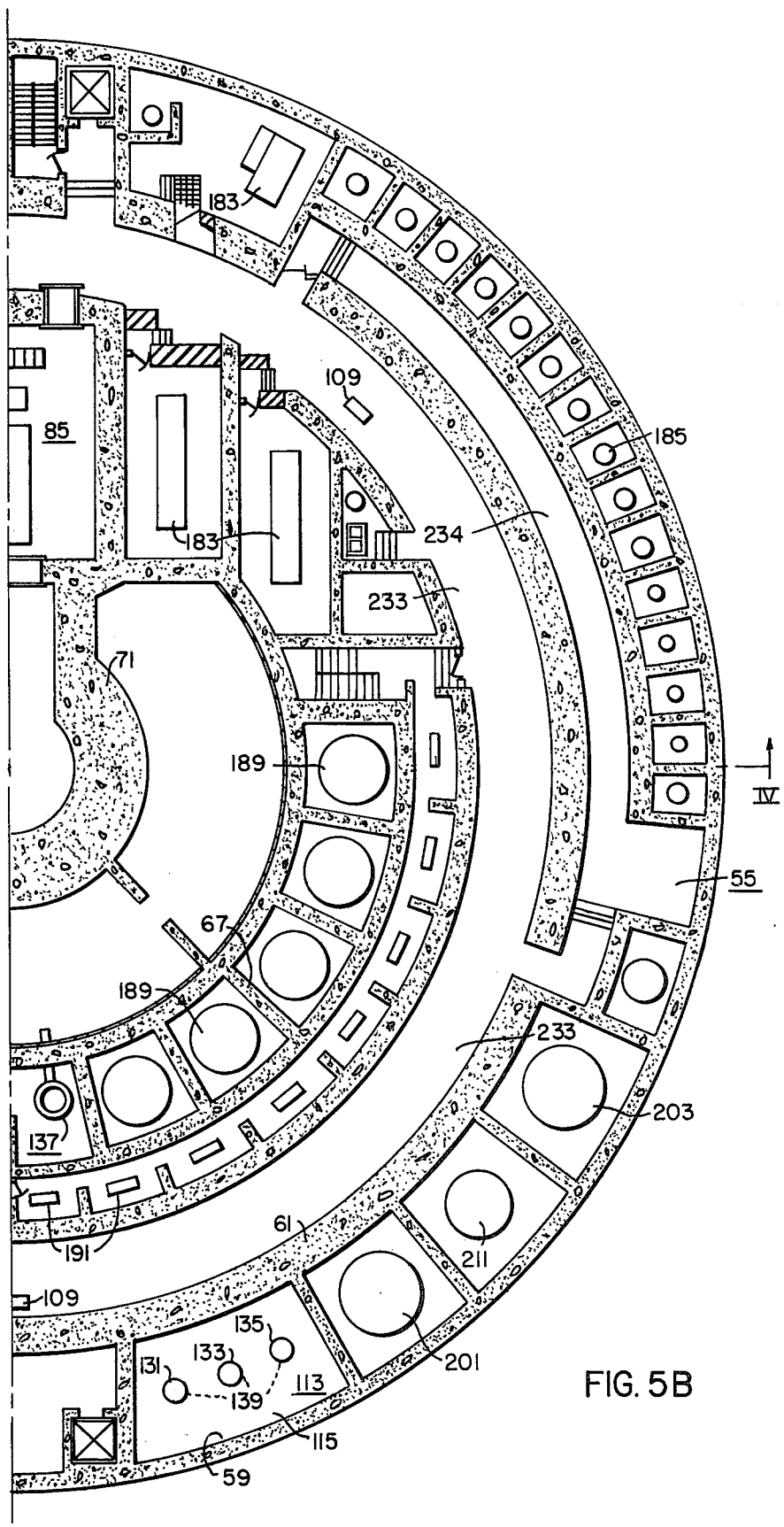

Each safety-injection-system train includes a high-head pump 131, a low-head pump 133 and a containment-spray pump 135 (FIGS. 2, 5A, 5B). These pumps 131, 133, 135 are supplied from the refueling coolant storage tank 101. The spray pump 135 is also supplied with an additive from a spray additive tank 136 in chamber 119. The high-head and low-head pumps 131 and 133 are typically of the multi-stage vertical type. Adequate head room is also provided for removal and replacements. The location of these pumps in individual shielded chambers 115, 117, 119 in the outer annulus of the truss 55 achieves these purposes. On the low-pressure side the pumps 131, 133 and 135 are connected to the refueling coolant storage tank 101, each train through a valve 137 (FIG. 2), sealed in a water tank 138, by suction lines 139. These lines 139 are in shallow trenches 141 in the plate 59 to assure an unimpeded operations and maintenance passageway between inner and outer equipment chambers of the truss 55. The high-pressure discharge line 145 from the high-head pump 131 is connected to the reactor coolant system through a valve 147; the high-pressure discharge line 149 from the low-head pump 133 is connected to this coolant system through a valve 151 and recirculation heat exchanger 41; high-pressure discharge line 153 from the spray pump 135 is connected to the containment spray system 155 through a valve 157.

The high-pressure discharge lines 145, 149, 153 pass through a piping chase 154 (FIG. 3B) to the valves 147, 151, 157 and enter the reactor containment by penetrating the top horizontal concrete slab 57 of the truss 55 (FIG. 2). High energy pipe runs inside and outside of containment are shortened by this arrangement. Within the containment 53 the lines from the pumps 131, 133, 135 are connected to the reactor through a system of controlled valves and check valves as shown in RESAR 41 (not shown here).

Power is supplied to each of the safety trains 113 from apparatus in a chamber 161 (FIGS. 3B, 8A, 8B, 9A, 9B) disposed adjacent its associated safety train. Each chamber 161 includes appropriate transformers 163 and 165, switchgear and safeguard equipment 167 and 169. Each chamber is powered by a diesel 170 (FIG. 3B) which is capable of operating when the power supplied by the nuclear reactor 23 is interrupted.

In the practice of this invention the refueling coolant storage tank 101 is maintained filled with coolant while the reactor is in operation. When the reactor is shut down for refueling, the coolant in the refueling coolant storage tank is used in its normal service, to fill the spent-fuel transfer canal (not shown). In accordance with this invention the sumps 109 are directly connected through the refueling coolant storage tank 101 to the safety trains 113 which in turn resupply coolant to the reactor in the event of a loss-of-coolant accident. The switchover which is demanded in apparatus in accordance with the teachings of the prior art is not required. The coolant conductors 139 are short compared to those demanded by the prior art because they need only pass from the respective safety trains 113 disposed around the tank 101 to corresponding nearby penetrations 171 (FIG. 2) in the tank 101. The conductors 145, 149, 153 are short because they need only pass from safety trains 113 to parts of the reactor 23 having about the same angular position about the axis of the reactor as the safety trains.

Typically the safety train pipe or conductor runs from the sump and refueling coolant storage tank to the pumps, thru the containment, to the reactor average about 470 ft. for the prior-art apparatus and about 185 ft. for the apparatus according to this invention. Some of this reduction (which may be conservatively stated as greater than 50%) is due to the simpler safety injection system which eliminates separate suction lines from the containment sump 109 and the refueling coolant storage tank 101. Other auxiliary systems appear to have piping reduced by 15 to 30% by the invention over prior art depending on the particular system. It is estimated then, that the invention results in piping savings of at least 20%. This represents a reduction in direct costs of about $4 million in 1973 dollars.

| Cost Comparison Summation of Invention Over Prior Art | |
| --- | --- |
| | Thousands Of Dollars |
| Excavation | +3* |
| Concrete | −95 |
| Piping | −4000 |
| Approx. Direct Cost Reduction | −4092 |
| Escalation (35%) | 1430 |
| S.T. | 5522 |
| Interest During Construction (30%) | 1660 |
| Approx. Total Cost Reduction | $7,182 |

*+ represents increased cost.
− represents reduced cost.

In this comparison it is assumed that the cost of external refueling water storage tanks and foundation slabs is approximately equal to the cost of lining the internal annular tank 101 with stainless steel.

Many of the components and equipment located in accordance with the teachings of the prior art in the auxiliary building are located in the truss 55. Among these are the chemical and volume control system, the waste-gas handling system, the waste-liquid handling system, and the steam generator blowdown system.

The chemical and volume control system is located partly in the truss 55 and partly in a simplified auxiliary building. System requirements (made more rigorous by RAPID refueling) make it desirable to locate the volume control tank 181 (FIG. 7B) at a high elevation (typically about 9 feet about plate 57) and the charging pumps 183 (FIG. 6B) at lowest level (they are in the truss) to achieve a high suction head with low gas pressure in the volume control tank 181. The head on the pumps is increased from about 15 feet to about 40 feet and the high pressure pipe runs from the charging pumps into the reactor coolant system are somewhat shortened by the pump and control tank locations.

The remainder of the control and volume control system equipment (external to the containment) is located in the Mechanical Auxiliary Building (not shown in detail) to consolidate the location of demineralizers 185 (FIGS. 5B, 6B) and their filters 187 (FIGS. 4B, 6B) and shorten runs of component cooling water piping to the heat exchangers of the system.

The entire waste gas handling system is located in the truss 55 because it is a large volume radioactive system with only moderate operation and maintenance requirements. This location provides radiation shielding and missile protection with reasonable access for operation and maintenance. The waste gas handling system includes decay tanks 189 (FIGS. 4B, 5B), pumps, recombiners and compressors (not shown).

Typically there may be insufficient space to locate all of the waste liquid handling system in the truss 55 and the demands of system operation and maintenance make it desirable to group filters, demineralizers, evaporators, and drumming facilities in an easily accessible position near the fuel handling building. It is practical however to locate the principle radioactive collection tanks in the truss 55 to take advantage of the available shielding and low elevation for gravity drainage. Accordingly, the waste hold up tank 201 (FIG. 5B), the floor drain tank 203, the laundry and hot shower tank 209 (FIG. 5A), and the chemical drain tank 211 (FIG. 5B) (along with their supporting transfer pumps (not shown) are incorporated in the truss.

Figure 4A:
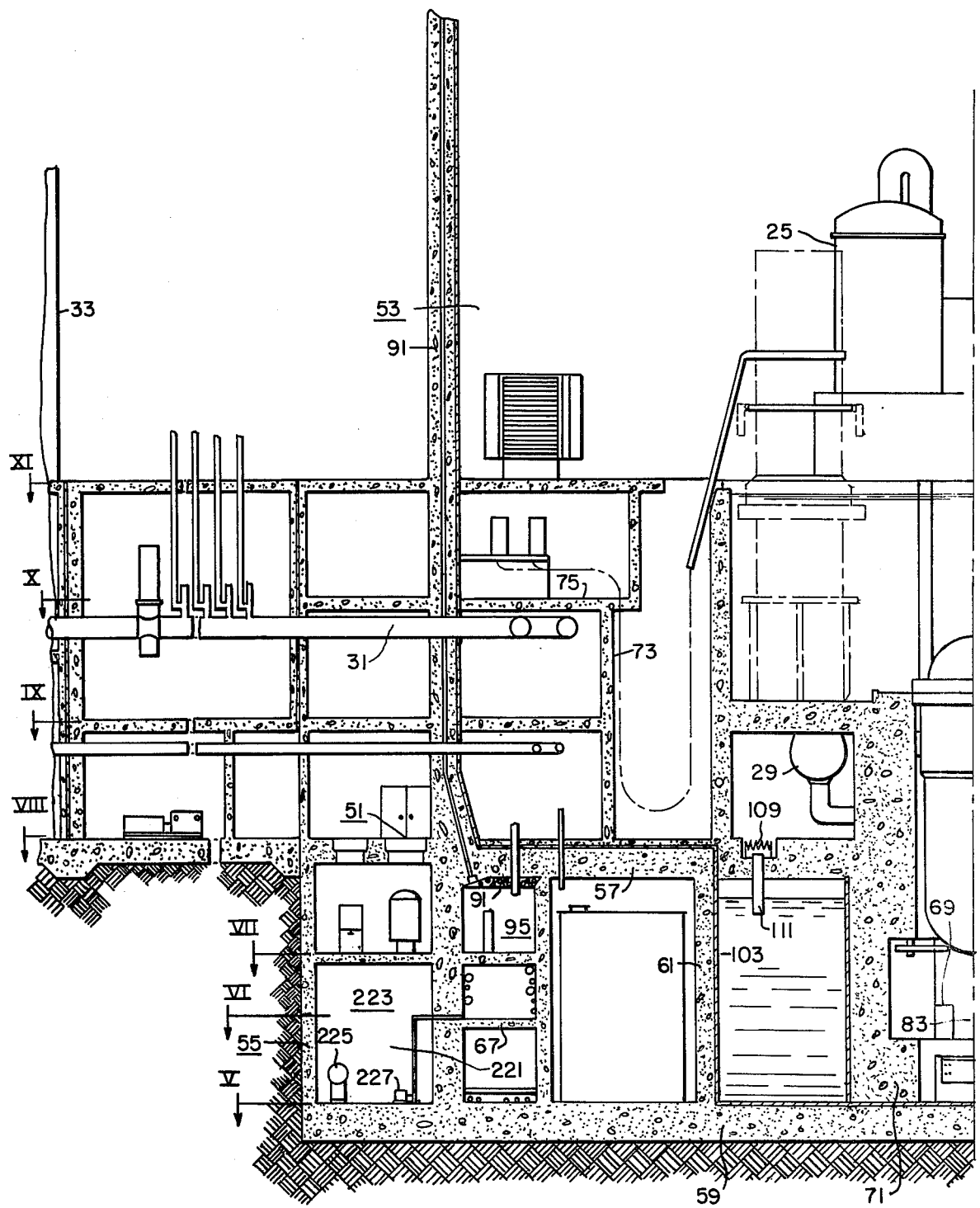
FIGS. 4A and 4B together constitute a view in longitudinal section taken along line IV—IV of FIGS. 5A and 5B.
Figure 4B:
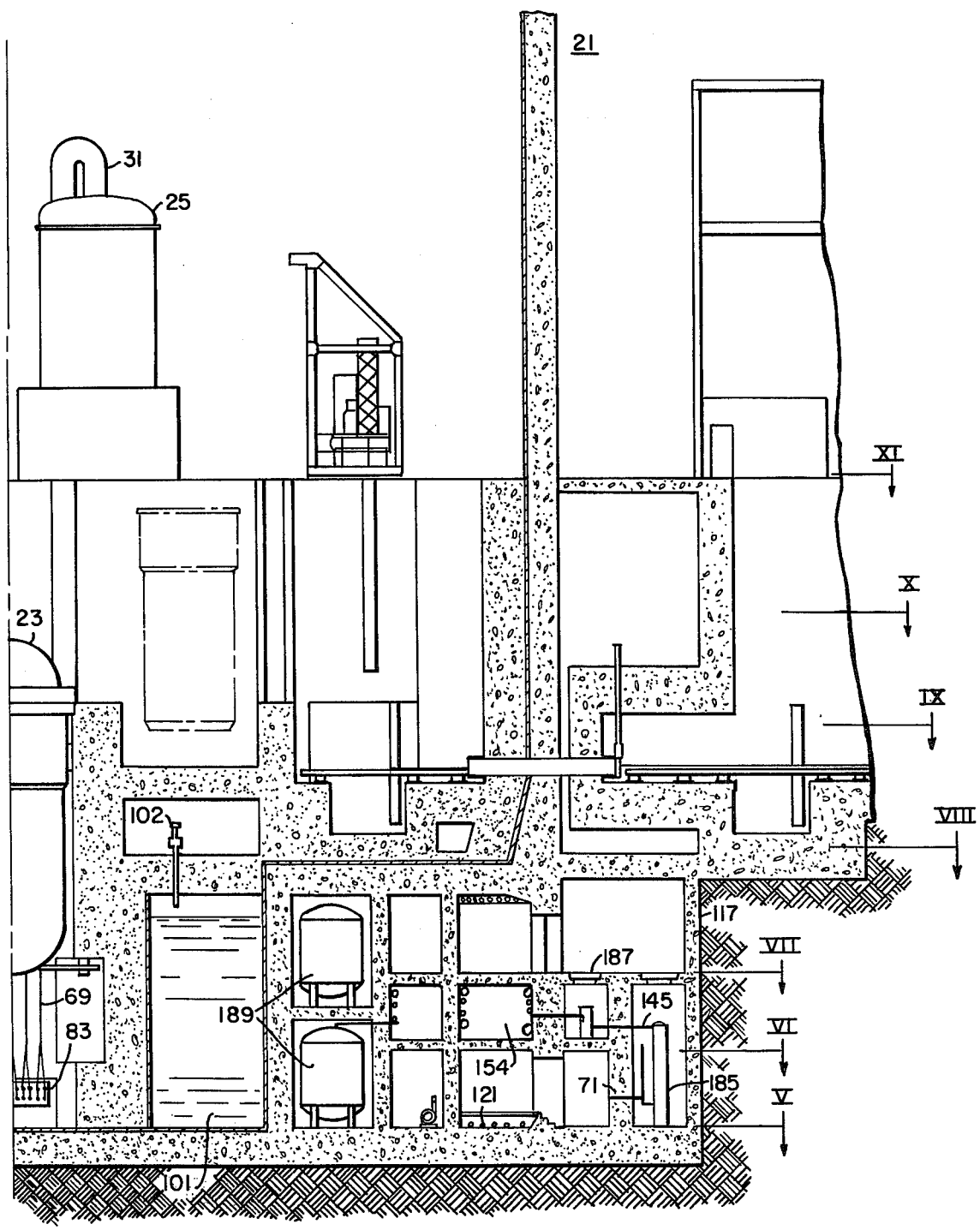

One of the spare chambers 221 is used to house part of the potentially radioactive steam generator blowdown system 223 (FIG. 4A). The heat exchanger 225, pumps 227 and surge tank 229 are located in the truss 55 space adjacent to the auxiliary building where the remainder of the system is housed.

Figure 7B:
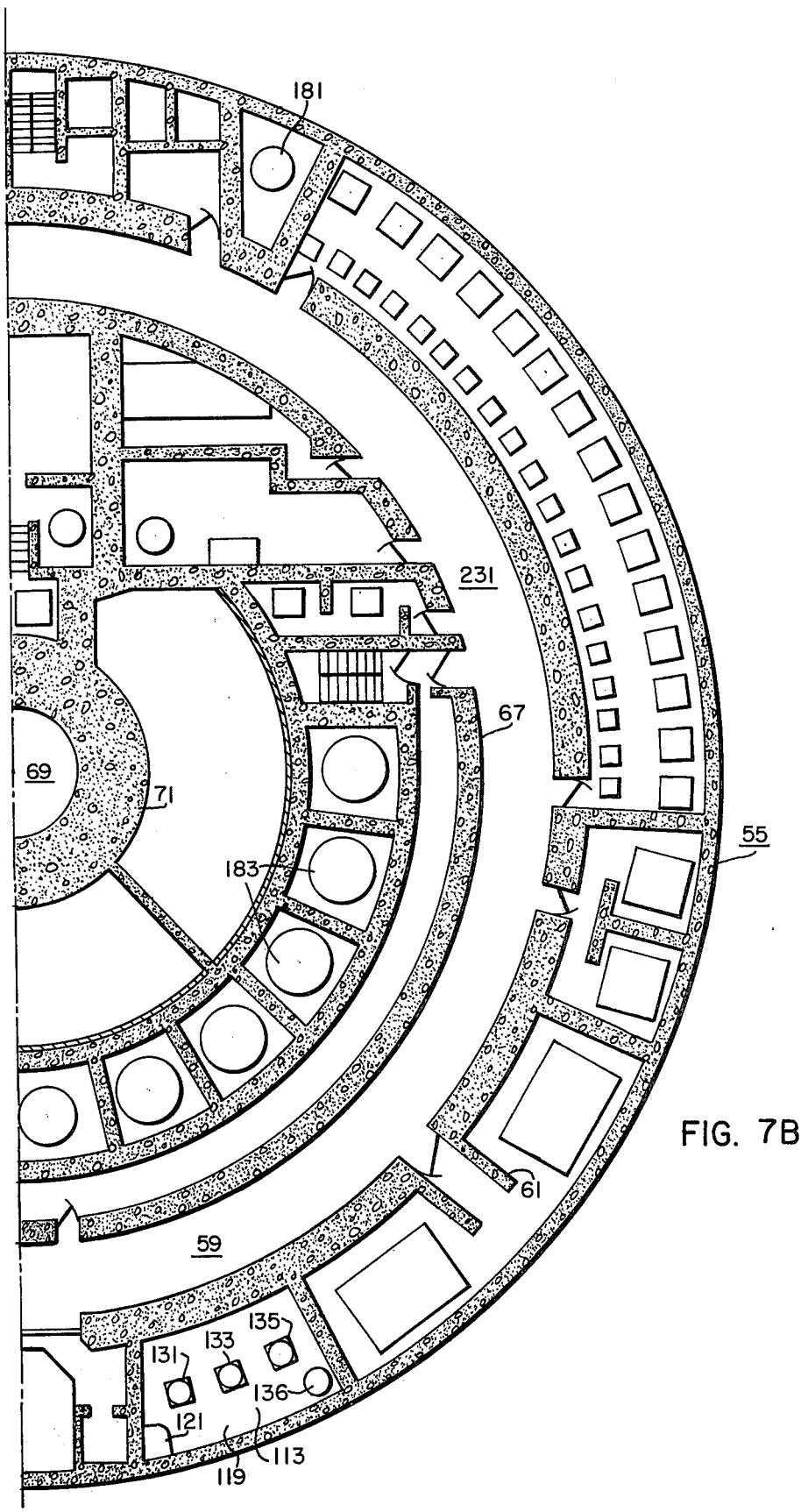
Figure 8A:
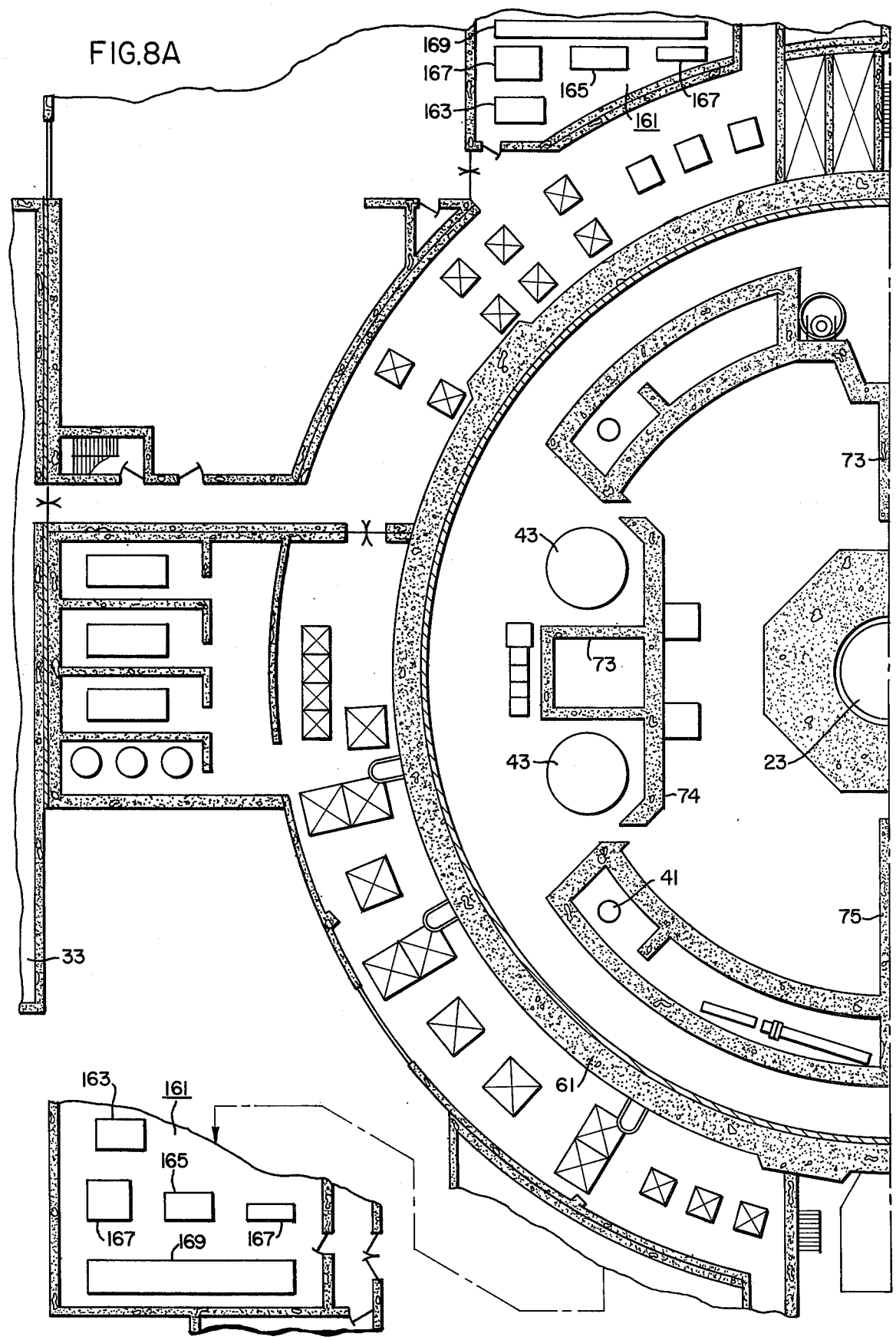
FIGS. 8A and 8B together constitute a view in transverse section taken along line VIII—VIII of FIGS. 4A and 4B.
Figure 8B:
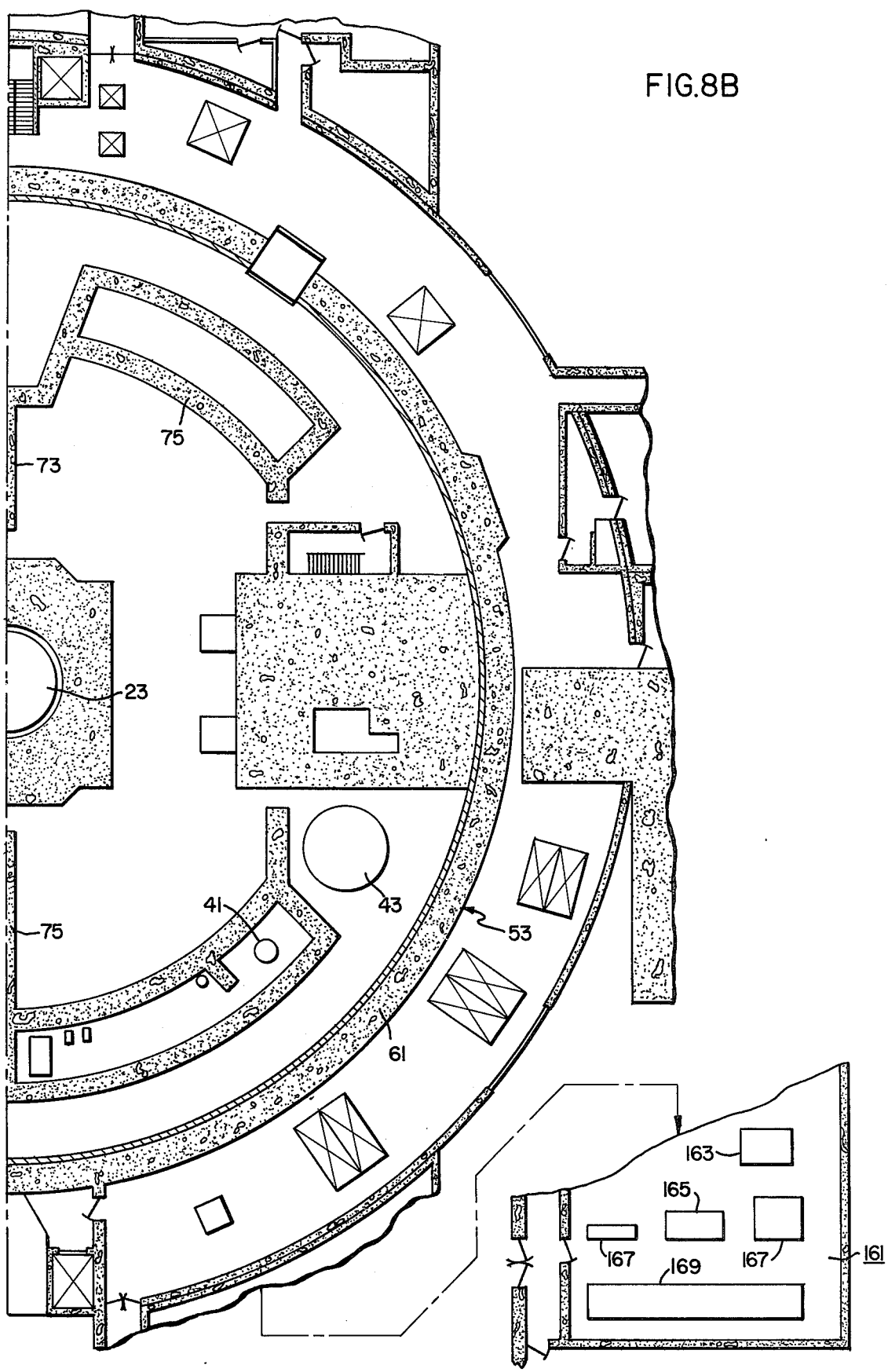

The truss 55 has facilities for service personnel, for example, an access gallery 231 for the tendon anchors 91 (FIG. 7B). There is also an annular access passageway 233 (FIG. 5B) for servicing personnel and a valve gallery 234 (FIG. 5B). Above the passageway 233 there is another valve gallery 235 (FIG. 6B) and a hot pipe chase 237.

While a preferred embodiment of this invention has been disclosed herein, many modifications thereof are feasible. This invention is not to be restricted except insofar as is necessitated by the spirit of the prior art.

What we claim is:

1. Energy generating apparatus including a nuclear reactor and auxiliary components and material for, and involved in the operation of, said reactor, a containment for said reactor, certain of said auxiliary components and material being contained within, and supported by, said containment, and a base for supporting both said reactor and said containment consisting of a truss, said truss being predominately hollow and being bounded by an upper generally-horizontal bounding plate and a lower generally-horizontal bounding plate and by a generally vertical bounding well interconnecting said upper and lower bounding plates near their external ends, said truss also including additional generally horizontal internal plates and vertical internal walls interposed between said bounding plates within said bounding upper and lower plates and said bounding wall, supporting said upper and lower plates, said internal plates and vertical internal walls and generally-horizontal bounding plates and bounding wall being formed into a rigid structural unit, throughout whose members the stresses produced by the weight of both said reactor and said containment and its contents are distributed, said bounding plates and bounding wall and said internal plates and walls defining chambers within which certain others of said auxiliary components and materials are disposed.

2. The apparatus of claim 1 wherein a plurality of coolant conductors extend from the reactor at different angles above the upper plate and at least one of the chambers is an annular refueling storage coolant tank extending between the upper plate and the lower plate, the said apparatus also including at least one sump extending through the upper plate into the one chamber to conduct coolant to said one chamber when said reactor suffers a loss-of-coolant accident, the said apparatus also including means connected to said tank and said reactor for conducting coolant from said tank to said reactor in the event of said accident.

3. The apparatus of claim 1 wherein the truss extends externally of the containment, the external portion of said truss including additional chambers and having access means to said additional chambers, and wherein said truss includes a refueling coolant storage tank having coolant and wherein pumping means, for circulating coolant from said tank through said reactor on the occurrence of a loss-of-coolant accident, is included in certain of said additional chambers readily accessible through said access means.

4. The apparatus of claim 3 wherein coolant conductors extend radially at different angles from the reactor within the containment and wherein the tank is in the portion of said truss within the containment directly below said conductors and wherein at least one sump is included in the portion of the plate between the conductors and the tank, and connects said portion to said tank whereby coolant discharged during a loss-of-coolant accident flows into said tank and is circulated back to said reactor by the pumping means.

5. The apparatus of claim 4 wherein the refueling coolant storage tank is in an annular chamber about the reactor.

6. The apparatus of claim 1 wherein one of the chambers is an annular chamber about the reactor serving as an access passageway for personnel and having access openings to certain of the other chambers.

7. The apparatus of claim 1 wherein the containment is prestressed by tendon anchors extending around the containment and wherein means for applying tension to said tendon anchors to provide the prestressing is contained in a chamber of the truss extending peripherally around the truss under the containment wall.

8. The apparatus of claim 1 wherein the truss serves as a foundation for the containment and is disposed in an excavation of substantial depth under said containment.

9. The apparatus of claim 1 wherein the upper horizontal plate and the lower horizontal plate of the truss are each of substantially smaller thickness than the mat which serves as a base in conventional apparatus.

10. The apparatus of claim 1 wherein the truss is disposed in an excavation of substantial depth under the containment and the waste-gas handling system of the apparatus is located within the chambers of the truss.

11. The apparatus of claim 10 wherein the principle radioactive collection tanks of the apparatus are also located within the chambers of the truss.

12. The apparatus of claim 1 wherein the truss is disposed in an excavation of substantial depth under the containment and the principle radioactive collection tanks of the apparatus are located within the chambers of the truss.

13. Energy generating apparatus including a nuclear reactor and auxiliary components for, and involving the operation of, said reactor, a containment for said reactor, certain of said auxiliary components and material being contained within, and supported by, said containment, and a base for supporting said container consisting of a predominately hollow truss bounded by upper and lower generally-horizontal bounding plates and a generally vertical bounding external wall between said bounding plates, said truss having within said bounding plates and said bounding wall a plurality of generally-horizontal internal plates and vertical internal walls, said bounding plates and bounding wall and said internal plates and walls defining chambers, at least one of said chambers being a refueling coolant, storage tank and including coolant therein, and at least another of said chambers including therein means, connected to said tank and to said reactor, for circulating said coolant to said reactor in the event that said reactor suffers a loss-of-coolant accident.

14. The apparatus of claim 13 wherein the one tank has metal liner sealing the coolant therein.

15. The apparatus of claim 13 wherein the reactor has a plurality of coolant conductors extending radially at different angles from said reactor and the circulating means includes a plurality of pump units positioned at different angles about said reactor connected through supply conductors to certain of said coolant conductors for circulating coolant from the tank to said certain conductors, said pump units being disposed within the chambers of the truss adjacent the refueling coolant storage tank, and said supply conductors passing to said coolant conductors thru the upper horizontal plate of the truss so that the lengths of said supply conductors are minimized.

16. The apparatus of claim 15 wherein the truss extends radially beyond the containment, the radial extension of said truss having therein chambers and the pump units are disposed within said chambers.

17. The apparatus of claim 13 wherein the reactor includes a plurality of coolant conductors extending from said reactor at different angles above the upper plate, and wherein there is a sump in said upper plate connected to the tank to conduct coolant to said tank in the event said reactor suffers a loss of coolant accident.

18. The apparatus of claim 13 wherein the reactor has a plurality of coolant conductors extending radially at different angles from said reactor, wherein the circulating means includes a plurality of pump units positioned at different angles about said reactor, each of said pump units having a plurality of high-pressure discharge lines, and wherein the truss has a piping chase, said high-pressure discharge lines being connected to said coolant conductors, through supply conductors in said piping chase, said supply conductors being connected to said high-pressure discharge lines through the walls of said truss and to said coolant conductors through the upper plate of said truss.

19. Energy generating apparatus for generating power of large magnitude, typically of a rating of 3400 thermal megawatts, including a nuclear reactor and auxiliary components and material for, and involved in the operation of, said reactor, a containment for said reactor, certain of said auxiliary components and material being contained within, and supported by, said containment and a base for supporting both said reactor and said containment consisting of a truss formed of upper and lower generally horizontal plates of concrete and vertical walls integral with the upper and lower plates and integrated into a rigid structural unit with said upper and lower plates, one of said vertical walls being an external wall, said truss being predominately hollow and being bounded by said external wall and by said upper and lower plates, others of said generally vertical walls being internal of said external wall and interconnecting said upper and lower plates.

* * * * *